US012360671B2

(12) United States Patent
Kukita et al.

(10) Patent No.: US 12,360,671 B2
(45) Date of Patent: Jul. 15, 2025

(54) EVALUATING STORAGE DEVICE FOR STORAGE MIGRATION

(71) Applicant: Hitachi, Ltd., Tokyo (JP)

(72) Inventors: Shota Kukita, Tokyo (JP); Takahiro Nakano, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 12 days.

(21) Appl. No.: 18/454,430

(22) Filed: Aug. 23, 2023

(65) Prior Publication Data
US 2024/0201854 A1  Jun. 20, 2024

(30) Foreign Application Priority Data
Dec. 20, 2022 (JP) .................. 2022-203662

(51) Int. Cl.
*G06F 3/06* (2006.01)
(52) U.S. Cl.
CPC ............ *G06F 3/061* (2013.01); *G06F 3/0647* (2013.01); *G06F 3/0653* (2013.01); *G06F 3/067* (2013.01)
(58) Field of Classification Search
CPC ...... G06F 3/061; G06F 3/0647; G06F 3/0653; G06F 3/067
USPC ........................................... 711/154
See application file for complete search history.

(56) References Cited

U.S. PATENT DOCUMENTS

| 9,678,836 B1* | 6/2017 | Westenberg .......... G06F 16/122 |
| 10,235,062 B1* | 3/2019 | Phadke ................... G06F 3/065 |
| 2010/0106990 A1* | 4/2010 | Kalman .................. G06F 3/067 |
| | | 713/340 |
| 2019/0026030 A1* | 1/2019 | Yang ..................... G06F 3/0649 |
| 2022/0026977 A1* | 1/2022 | Sanders ................ G06F 3/0688 |
| 2022/0121531 A1* | 4/2022 | Murti ................... G06F 11/1469 |

FOREIGN PATENT DOCUMENTS

WO  WO-2014/024251 A1  2/2014

OTHER PUBLICATIONS

Office Action issued in corresponding JP Application No. 2022-203662, dated Jun. 25, 2024 with English translation (6 pages).

\* cited by examiner

*Primary Examiner* — Than Nguyen
(74) *Attorney, Agent, or Firm* — Foley & Lardner LLP

(57) ABSTRACT

A storage operation support apparatus includes a storage unit that stores storage device information that stores information on a state of a storage device and an evaluation unit that evaluates an evaluation target storage device to be evaluated. With reference to the storage device information, the evaluation unit calculates an environment score indicating a magnitude of a load on an environment of the evaluation target storage device, calculates a cost score indicating a magnitude of a cost of the evaluation target storage device, calculates a performance score indicating a slow speed of reading and writing data of the evaluation target storage device, and calculates a total score using the environment score, the cost score, and the performance score.

12 Claims, 26 Drawing Sheets

| STORAGE DEVICE ID | EXTRACTION DATE AND TIME | INSTALLATION REGION | PRODUCT NAME | POWER SUPPLY SOURCE | POWER SUPPLY SOURCE $CO_2$ EMISSION COEFFICIENT [kgCO2/kW] | ANNUAL POWER CONSUMPTION [kW/year] | RENEWABLE ENERGY ANNUAL POWER CONSUMPTION [kW/year] | IOPS OF THE STORAGE DEVICE | CAPACITY [TB] | COMPRESSION RATE | PRICE [M¥] | SERVICE LIFE [year] |
|---|---|---|---|---|---|---|---|---|---|---|---|---|
| Ref1 | 2022/7/11 12:00:00 | — | — | — | 0.441 | 534.4 | 10 | 1000 | 600 | 1 | 30 | 5 |
| XX1 | 2022/7/11 12:00:00 | PREFECTURE B | PRODUCT A | PLANT A1 OF POWER COMPANY A | 0.441 | 434.4 | 10 | 800 | 500 | 1 | 20 | 5 |
| ... | ... | ... | ... | ... | ... | ... | ... | ... | ... | ... | ... | ... |

| STORAGE DEVICE ID 401 | EXTRACTION DATE AND TIME 402 | SERVICE NAME 403 | ANNUAL $CO_2$ EMISSION AMOUNT PER CAPACITY [$kgCO_2$/TB] 404 | MONTHLY USAGE FEE PER CAPACITY [¥/TB/month] 405 | VOLUME USAGE CAPACITY [TB] 406 | MAXIMUM STORAGE CAPACITY [TB] 407 |
|---|---|---|---|---|---|---|
| Ref1 | 2022/7/11 12:00:00 | — | 25 | 80 | 83 | 600 |
| BBBYY1 | 2022/7/10 12:00:00 | SERVICE B | 27 | 30 | 83 | 600 |
| ... | ... | ... | ... | ... | ... | ... |

| 501 | 502 | 503 | 504 | 505 |
|---|---|---|---|---|
| VOLUME ID | EXTRACTION DATE AND TIME | STORAGE DEVICE ID | VOLUME IOPS | VOLUME CAPACITY |
| AAAXX1 | 2022/7/11 12:00:00 | X1 | 205 | 93.6 |
| AAAXX2 | 2022/7/11 12:00:00 | X1 | 105 | 93.6 |
| ... | ... | ... | ... | ... |
| BBBYY1 | 2022/7/10 12:00:00 | Y1 | 70 | 83 |
| ... | ... | ... | ... | ... |

| 601 | 602 |
|---|---|
| POWER SUPPLY SOURCE | LOCATION |
| PLANT A1 OF COMPANY A | www.tepco.co.jp/ep/notice/news/ |
| PLANT A2 OF COMPANY A | ww.tepco.co.jp/ep/notice/news/ |
| ... | ... |

| VOLUME ID 701 | EVALUATION DATE AND TIME 702 | PRODUCT NAME/ SERVICE NAME 703 | TOTAL SCORE 704 | PREVIOUS TOTAL SCORE 705 | CO$_2$ EMISSION AMOUNT [kgCO$_2$] 706 | COST [M¥] 707 | IOPS 708 | ENVIRONMENT SCORE 709 | COST SCORE 710 | PERFORMANCE SCORE 711 |
|---|---|---|---|---|---|---|---|---|---|---|
| AAxx1 | 2022/7/12 12:00:00 | PRODUCT A | 97.4 | 94.8 | 60 | 1.5 | 80.5 | 80.5 | 60 | 80.5 |
| AAxx2 | 2022/7/12 12:00:00 | PRODUCT A | 83.2 | 85 | 50.3 | 2.5 | 98.5 | 98.5 | 50.3 | 98.5 |
| ... | ... | ... | ... | ... | ... | ... | ... | ... | ... | ... |

| STORAGE ID 801 | EVALUATION DATE AND TIME 802 | PRODUCT NAME/ SERVICE NAME 803 | TOTAL SCORE 804 | PREVIOUS TOTAL SCORE 805 | $CO_2$ EMISSION AMOUNT [kg$CO_2$] 806 | COST [M¥] 807 | IOPS 808 | ENVIRONMENT SCORE 809 | COST SCORE 810 | PERFORMANCE SCORE 811 |
|---|---|---|---|---|---|---|---|---|---|---|
| X1 | 2022/7/12 12:00:00 | PRODUCT A | 1974 | 190.8 | 310 | 30 | 82 | 80.5 | 560 | 900 |
| X2 | 2022/7/11 11:00:00 | PRODUCT A | 1832 | 85 | 250 | 20 | 95 | 98.5 | 50.3 | 600 |
| ... | ... | ... | ... | ... | ... | ... | ... | ... | ... | ... |

| CANDIDATE STORAGE ID | VENDOR NAME | PRODUCT NAME | PRICE [M¥] | SERVICE LIFE [year] | STORAGE ANNUAL POWER CONSUMPTION [kW] | IOPS | MAXIMUM CAPACITY [TB] | COMPRESSION RATE | NUMBER OF REDUNDANT DATA | REDUCTION FUNCTION |
|---|---|---|---|---|---|---|---|---|---|---|
| 901 | 902 | 903 | 904 | 905 | 906 | 907 | 908 | 909 | 910 | 911 |
| xx | hitachi | PRODUCT A | 20 | 5 | 534.4 | 800 | 1000 | 0.5 | 1 | PRESENCE |
| ... | ... | ... | ... | ... | ... | ... | ... | ... | ... | ... |

| CANDIDATE STORAGE ID 1001 | VENDOR NAME 1002 | SERVICE NAME 1003 | MONTHLY USAGE FEE PER CAPACITY [¥/TB/month] 1004 | ANNUAL $CO_2$ EMISSION AMOUNT PER CAPACITY [kg$CO_2$/TB] 1005 | IOPS 1006 | MAXIMUM CAPACITY [TB] 1007 |
|---|---|---|---|---|---|---|
| yy | hws | SERVICE B | 80/TB | 29 | 800 | UNLIMITED |
| ... | ... | ... | ... | ... | ... | ... |

FIG. 11

| 1101 SET DATE AND TIME | 1102 TYPE | 1103 IMPORTANCE BALANCE, ENVIRONMENT: COST: PERFORMANCE | 1104 ASSUMED CAPACITY [TB] | 1105 IOPS | 1106 RESPONSE TIME [ms] | 1107 THROUGHPUT [MB/s] | 1108 APPARENT MIGRATION REDUCTION FUNCTION | 1109 RELIABILITY (ALLOWABLE NUMBER OF FAILURE POINTS) | 1110 TARGET $CO_2$ REDUCTION AMOUNT [%] | 1111 $CO_2$ EMISSION UPPER LIMIT [$kgCO_2$/year] | 1112 POWER CONSUMPTION UPPER LIMIT [kWh] |
|---|---|---|---|---|---|---|---|---|---|---|---|
| 2022/7/11 12:00:00 | Block | 40:50:10 | 120 | — | — | — | — | 1 | 20 | — | — |
| 2022/7/10 12:00:00 | File | 60:20:20 | 70 | — | — | — | — | 2 | — | — | — |
| ... | ... | ... | ... | ... | ... | ... | ... | ... | ... | ... | ... |

| CANDIDATE STORAGE ID | PRODUCT NAME / SERVICE NAME | EVALUATION DATE AND TIME | $CO_2$ EMISSION AMOUNT [kgCO$_2$] | COST [M¥] | IOPS | TOTAL SCORE | ENVIRONMENT SCORE | COST SCORE | PERFORMANCE SCORE |
|---|---|---|---|---|---|---|---|---|---|
| xx | PRODUCT B | 2022/7/11 12:00:00 | 567 | 77 | 75.9 | 90 | 78.3 | 70 | 60.5 |
| ... | ... | ... | ... | ... | ... | ... | ... | ... | ... |
| yy | SERVICE B | 2022/7/11 12:00:00 | 789 | 75 | 75.5 | 88 | 75.3 | 60 | 60.2 |
| ... | ... | ... | ... | ... | ... | ... | ... | ... | ... |

| 241 | | | | | | | | |
|---|---|---|---|---|---|---|---|---|
| MIGRATION ID 1301 | MIGRATION SOURCE STORAGE ID 1302 | MIGRATION SOURCE VOLUME ID 1303 | MIGRATION DESTINATION STORAGE ID 1304 | MIGRATION DESTINATION VOLUME ID 1305 | MIGRATION TIME REDUCTION FUNCTION 1306 | ESTIMATED MIGRATION TIME [MINUTES] 1307 | EXECUTION INSTRUCTION 1308 |
| mv11 | X1 | XX1 | Y1 | Y11 | PRESENCE | 5 | PRESENCE |
| mv12 | X1 | XX3 | Y3 | Y31 | PRESENCE | 45 | ABSENCE |
| ... | ... | ... | ... | ... | ... | ... | ... |

| MIGRATION ID 1401 | MIGRATION SOURCE STORAGE ID 1402 | MIGRATION SOURCE VOLUME ID 1403 | MIGRATION DESTINATION STORAGE ID 1404 | MIGRATION DESTINATION VOLUME ID 1405 | MIGRATION TIME REDUCTION FUNCTION 1406 | MIGRATION POSSIBLE TIME 1407 | EXECUTION INSTRUCTION 1408 |
|---|---|---|---|---|---|---|---|
| mv31 | X1 | XX2 | Y2 | Y21 | ABSENCE | 2022/7/12 1:30:00 | ABSENCE |
| ... | ... | ... | ... | ... | ... | ... | ... |

| MIGRATION SOURCE STORAGE ID | TIME | READ SPEED [M/s] |
|---|---|---|
| X1 | 0:00 | 50 |
| X1 | 0:15 | 51 |
| ... | ... | ... |

Columns labeled 1501, 1502, 1503.

| MIGRATION DESTINATION STORAGE ID | TIME | WRITE SPEED [M/s] |
|---|---|---|
| X1 | 0:00 | 50 |
| X1 | 0:15 | 51 |
| ... | ... | ... |

Columns labeled 1601, 1602, 1603.

FIG. 22

$CO_2$ EMISSION AMOUNT OF VOLUME = VOLUME CAPACITY × COMPRESSION RATE / STORAGE DEVICE CAPACITY × (ANNUAL POWER CONSUMPTION OF STORAGE − ANNUAL POWER CONSUMPTION OF RENEWABLE ENERGY) × $CO_2$ EMISSION COEFFICIENT ... EXPRESSION (1A1)
ENVIRONMENT SCORE OF VOLUME = ENVIRONMENT COEFFICIENT × $CO_2$ EMISSION AMOUNT OF VOLUME ... EXPRESSION (1A2)
ANNUAL COST OF VOLUME = VOLUME CAPACITY × COMPRESSION RATE / STORAGE DEVICE CAPACITY × STORAGE DEVICE PRICE / STORAGE SERVICE LIFE ... EXPRESSION (1B1)
COST SCORE OF VOLUME = COST COEFFICIENT × ANNUAL COST OF VOLUME ... EXPRESSION (1B2)
PERFORMANCE OF VOLUME = IOPS OF VOLUME ... EXPRESSION (1C1)
PERFORMANCE SCORE OF VOLUME = PERFORMANCE COEFFICIENT × (PERFORMANCE REFERENCE VALUE − IOPS OF VOLUME) ... EXPRESSION (1C2)
TOTAL SCORE = ENVIRONMENT SCORE WEIGHT × ENVIRONMENT SCORE + COST SCORE WEIGHT × COST SCORE + PERFORMANCE SCORE WEIGHT × PERFORMANCE SCORE ... EXPRESSION (D)

$CO_2$ EMISSION AMOUNT OF VOLUME = VOLUME CAPACITY × ANNUAL $CO_2$ EMISSION AMOUNT PER CAPACITY ... EXPRESSION (2A1)
ENVIRONMENT SCORE OF VOLUME = ENVIRONMENT COEFFICIENT × $CO_2$ EMISSION AMOUNT OF VOLUME ... EXPRESSION (2A2)
ANNUAL COST OF VOLUME = VOLUME CAPACITY × MONTHLY USAGE FEE PER CAPACITY × 12 ... EXPRESSION (2B1)
COST SCORE OF VOLUME = COST COEFFICIENT × ANNUAL COST OF VOLUME ... EXPRESSION (2B2)
PERFORMANCE OF VOLUME = IOPS OF VOLUME ... EXPRESSION (2C1)
PERFORMANCE SCORE OF VOLUME = PERFORMANCE COEFFICIENT × (PERFORMANCE REFERENCE VALUE − IOPS OF VOLUME) ... EXPRESSION (2C2)

$CO_2$ EMISSION AMOUNT OF STORAGE DEVICE = (ANNUAL POWER CONSUMPTION OF STORAGE − ANNUAL POWER CONSUMPTION OF RENEWABLE ENERGY) × $CO_2$ EMISSION COEFFICIENT ... EXPRESSION (3A1)
ENVIRONMENT SCORE OF STORAGE DEVICE = ENVIRONMENT COEFFICIENT × $CO_2$ EMISSION AMOUNT OF VOLUME ... EXPRESSION (3A2)
ANNUAL COST OF STORAGE DEVICE = STORAGE DEVICE PRICE / STORAGE SERVICE LIFE ... EXPRESSION (3B1)
COST SCORE OF STORAGE DEVICE = COST COEFFICIENT × ANNUAL COST OF VOLUME ... EXPRESSION (3B2)
PERFORMANCE OF STORAGE DEVICE = IOPS OF VOLUME ... EXPRESSION (3C1)
PERFORMANCE SCORE OF STORAGE DEVICE = PERFORMANCE COEFFICIENT × (PERFORMANCE REFERENCE VALUE − IOPS OF STORAGE DEVICE) ... EXPRESSION (3C2)

$CO_2$ EMISSION AMOUNT OF STORAGE DEVICE = VOLUME CAPACITY × ANNUAL $CO_2$ EMISSION AMOUNT PER CAPACITY ... EXPRESSION (4A1)
ENVIRONMENT SCORE OF STORAGE DEVICE = ENVIRONMENT COEFFICIENT × $CO_2$ EMISSION AMOUNT OF VOLUME ... EXPRESSION (4A2)
ANNUAL COST OF STORAGE DEVICE = VOLUME CAPACITY × MONTHLY USAGE FEE PER CAPACITY × 12 ... EXPRESSION (4B1)
COST SCORE OF STORAGE DEVICE = COST COEFFICIENT × ANNUAL COST OF VOLUME ... EXPRESSION (4B2)
PERFORMANCE OF STORAGE DEVICE = IOPS OF VOLUME ... EXPRESSION (4C1)
PERFORMANCE SCORE OF STORAGE DEVICE = PERFORMANCE COEFFICIENT × (PERFORMANCE REFERENCE VALUE − IOPS OF VOLUME) ... EXPRESSION (4C2)

FIG. 23

```
                                                          2300
┌────────────────────────────────────────────────────────────┐
│                    EVALUATION SCREEN              □ ▫ ×   │
│  ┌──────────────────────────────────────────────────────┐ │
│      1901        1902              1903                    │
│   ┌────────┐ ┌──────────────────┐ ┌──────────────┐ 1905    │
│   │STORAGE │ │NEW STORAGE       │ │  MIGRATION   │        │
│   │IN USE  │ │CANDIDATE         │ │   SUPPORT    │        │
│  ┌┴────────┴─┴──────────────────┴─┴──────────────┴──────┐ │
│  │ TYPE  2311        REQUIREMENT       2312b            │ │
│  │  ⦿ BLOCK    2012a─☐ ASSUMED CAPACITY [    ] TB OR MORE│ │
│  │  ○ FILE           ☐ IOPS            [    ] MORE      │ │
│  │  ○ OBJECT   2313  ☐ (RESPONSE TIME) [  ] TO [  ] ms  │ │
│  │ ┌─IMPORTANCE BALANCE─┐ ☐(THROUGHPUT)[  ] TO [  ] MB/s│ │
│  │ │        2313a       │ ☐ APPARENT MIGRATION TIME     │ │
│  │ │ ENVIRONMENT        │   REDUCTION FUNCTION  ▼ N (Y/N)│ │
│  │ │      [60 %]        │ ☑ RELIABILITY  ▼ 1  POINT     │ │
│  │ │       ↑    2313d   │                     FAILURE   │ │
│  │ │       •  ↙         │                     ALLOWED   │ │
│  │ │      • •           │ ENVIRONMENT TARGET VALUE      │ │
│  │ │    ↙     ↘         │ ☑ COMPARED WITH CURRENT SYSTEM│ │
│  │ │COST 2313b PERFORMANCE│ CO2 REDUCTION [ 20 ] % REDUCTION│
│  │ │[20 %]    [20 %]    │    AMOUNT            DESIRED  │ │
│  │ │     2313c          │ ☐ CO2 EMISSION  [    ] WITHIN │ │
│  │ └────────────────────┘    AMOUNT              kg/year│ │
│  │                        ☐ POWER        [    ] WITHIN  │ │
│  │                          CONSUMPTION         kWh     │ │
│  │                                       ┌────────────┐2314│
│  │                                       │CANDIDATE   │ │ │
│  │                                       │CALCULATION │ │ │
│  │                                       └────────────┘ │ │
│  └──────────────────────────────────────────────────────┘ │
└────────────────────────────────────────────────────────────┘
```

FIG. 25

$CO_2$ EMISSION AMOUNT OF CANDIDATE STORAGE DEVICE
= ANNUAL POWER CONSUMPTION OF STORAGE × $CO_2$ EMISSION COEFFICIENT ... EXPRESSION (5A1)
ENVIRONMENT SCORE OF CANDIDATE STORAGE DEVICE
= ENVIRONMENT COEFFICIENT × $CO_2$ EMISSION AMOUNT OF VOLUME ... EXPRESSION (5A2)
ANNUAL COST OF CANDIDATE STORAGE DEVICE = STORAGE DEVICE PRICE / STORAGE SERVICE LIFE ... EXPRESSION (5B1)
COST SCORE OF CANDIDATE STORAGE DEVICE = COST COEFFICIENT × ANNUAL COST OF VOLUME ... EXPRESSION (5B2)
PERFORMANCE OF CANDIDATE STORAGE DEVICE = IOPS OF VOLUME ... EXPRESSION (5C1)
PERFORMANCE SCORE OF CANDIDATE STORAGE DEVICE
= PERFORMANCE COEFFICIENT × (PERFORMANCE REFERENCE VALUE − IOPS OF STORAGE DEVICE) ... EXPRESSION (5C2)

$CO_2$ EMISSION AMOUNT OF CANDIDATE STORAGE DEVICE
= VOLUME CAPACITY × ANNUAL $CO_2$ EMISSION AMOUNT PER CAPACITY ... EXPRESSION (6A1)
ENVIRONMENT SCORE OF CANDIDATE STORAGE DEVICE
= ENVIRONMENT COEFFICIENT × $CO_2$ EMISSION AMOUNT OF VOLUME ... EXPRESSION (6A2)
ANNUAL COST OF CANDIDATE STORAGE DEVICE
= VOLUME CAPACITY × MONTHLY USAGE FEE PER CAPACITY × 12 ... EXPRESSION (6B1)
COST SCORE OF CANDIDATE STORAGE DEVICE = COST COEFFICIENT × ANNUAL COST OF VOLUME ... EXPRESSION (6B2)
PERFORMANCE OF CANDIDATE STORAGE DEVICE = IOPS OF VOLUME ... EXPRESSION (6C1)
PERFORMANCE SCORE OF CANDIDATE STORAGE DEVICE
= PERFORMANCE COEFFICIENT × (PERFORMANCE REFERENCE VALUE − IOPS OF VOLUME) ... EXPRESSION (6B2)

EVALUATING STORAGE DEVICE FOR STORAGE MIGRATION

BACKGROUND OF THE INVENTION

1. Field of the Invention

The present invention relates to a storage operation support apparatus and a storage operation support method for evaluating a storage device.

2. Description of the Related Art

In order to easily share data, data is widely stored in a storage device connected via a computer network. Here, not only a large number of storage devices in an on-premises environment but also a large number of storage devices in a cloud environment are used as the storage device. Then, there is a technique of evaluating a storage device so that an appropriate storage device can be selected and used. For example, WO 2014/024251 A describes a technique for evaluating performance and cost of a storage device in a cloud environment. The use of the technique described in WO 2014/024251 A makes it easy to evaluate the performance and cost of a storage device in a cloud environment to be newly introduced and to select a storage device in a preferable cloud environment.

SUMMARY OF THE INVENTION

By the way, the technology described in WO 2014/024251 A cannot evaluate a storage device in an on-premises environment. Then, there is a case where both the storage device in the on-premises environment and the storage device in the cloud environment are evaluated and compared, and an appropriate storage device is selected and used. In this case, even when the technology described in WO 2014/024251 A is used, it is not easy to evaluate and compare and examine both the storage device in the on-premises environment and the storage device in the cloud environment.

In addition, it is required to select and use a storage device in which a load on the environment, cost, and performance are balanced. Therefore, it is required to perform various evaluations on the storage device. For example, it is required to evaluate the load on the environment such as a carbon dioxide emission amount with respect to the storage device.

Then, the use of an old storage device or a high-cost storage device is stopped, and a new storage device is used instead. At that time, it is necessary to efficiently perform a migration work of copying data stored in a volume created in the storage device to a volume of another storage device. In order to suppress the data stored in a volume of a migration source of the storage device from becoming unusable when necessary, it is also required to evaluate performance of reading the data of the storage device of the migration source and performance of writing the data of the storage device of the migration destination and to migrate the volume at an appropriate timing.

Therefore, an object of the present invention is to provide a storage operation support apparatus and a storage operation support method that facilitate operation of a storage device by facilitating various evaluations of the storage device.

In order to achieve the above object, according to an aspect of the present invention, there is provided a storage operation support apparatus that evaluates a storage device, the storage operation support apparatus including: a storage unit that stores storage device information that stores information on a state of a storage device; and an evaluation unit that evaluates an evaluation target storage device to be evaluated, in which with reference to the storage device information, the evaluation unit calculates an environment score indicating a magnitude of a load on an environment of the evaluation target storage device, calculates a cost score indicating a magnitude of a cost of the evaluation target storage device, calculates a performance score indicating a slow speed of reading and writing data of the evaluation target storage device, and calculates a total score using the environment score, the cost score, and the performance score.

In addition, according to another aspect of the present invention, there is provided a storage operation support method in a storage operation support apparatus including a memory device that stores storage device information for storing information on a state of a storage device and a processor, in which the processor evaluates the storage device, the storage operation support method including causing the processor to execute evaluation processing of evaluating an evaluation target storage device to be evaluated, in which the evaluation processing includes, with reference to the storage device information stored in the memory device, calculating an environment score indicating a magnitude of a load on an environment of the evaluation target storage device, calculating a cost score indicating a magnitude of a cost of the evaluation target storage device, calculating a performance score indicating a slow speed of reading and writing data of the evaluation target storage device, and calculating a total score using the environment score, the cost score, and the performance score.

According to a representative embodiment of the present invention, the operation of the storage device is facilitated by facilitating various evaluations of the storage device. Problems, configurations, and effects other than those described above will be clarified by the following description of embodiments.

BRIEF DESCRIPTION OF THE DRAWINGS

FIG. 3 is a diagram illustrating an example of an on-premises environment storage device operation information table;

FIG. 4 is a diagram illustrating an example of a cloud environment storage device operation information table;

FIG. 5 is a diagram illustrating an example of a volume operation information table;

FIG. 6 is a diagram illustrating an example of a $CO_2$ emission coefficient acquisition location table;

FIG. 7 is a diagram illustrating an example of a volume evaluation table;

FIG. 8 is a diagram illustrating an example of a storage device evaluation table;

FIG. 9 is a diagram illustrating an example of an on-premises environment storage candidate information table;

FIG. 10 is a diagram illustrating an example of a cloud environment storage candidate information table;

FIG. 11 is a diagram illustrating an example of a requirement information table;

FIG. 12 is a diagram illustrating an example of a requirement satisfaction storage device table;

FIG. 13 is a diagram illustrating an example of a migration possible table;

FIG. 14 is a diagram illustrating an example of a migration hold table;

FIG. 15 is a diagram illustrating an example of a migration source storage read speed table;

FIG. 16 is a diagram illustrating an example of a migration destination storage write speed table;

FIG. 22 is a diagram illustrating an example of an expression for calculating a score;

FIG. 23 is an explanatory diagram illustrating an example of the evaluation screen;

FIG. 25 is a diagram illustrating an example of an expression for calculating the score;

DESCRIPTION OF THE PREFERRED EMBODIMENTS

Figure 1:
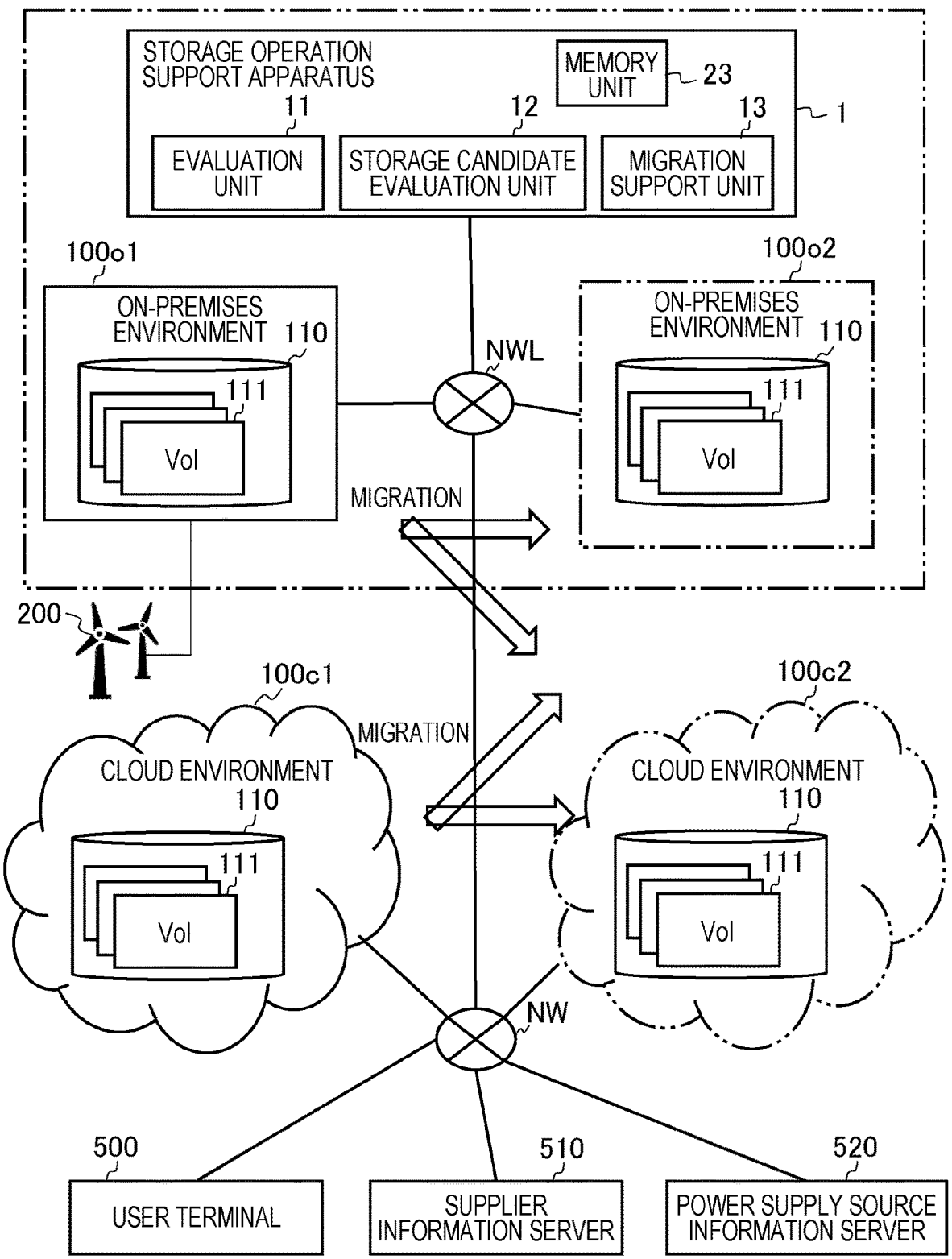
FIG. 1 is a diagram illustrating an example of a functional block diagram of a storage operation support apparatus according to an embodiment.

Hereinafter, embodiments of the present invention will be described with reference to the drawings. However, the present invention is not to be construed as being limited to the description of the following embodiments. Those skilled in the art can easily understand that the specific configuration can be changed without departing from the spirit or gist of the present invention.

In the configurations of the invention described below, the same or similar configurations or functions are denoted by the same reference numerals, and redundant description is omitted.

Notations such as "first", "second", and "third" in the present specification and the like are attached to identify components, and do not necessarily limit the number or order.

In the present specification and the like, as an example of various types of information, an expression of an "XX table" may be described, but the various types of information may be expressed by a data structure such as an "XX list" or an "XX queue". The "XX table" may be "XX information". In describing the identification information, expressions such as "identification information", "identifier", "name", "ID", and "number" are used, but these can be replaced with each other.

Embodiment

FIG. 1 is a diagram illustrating an example of a functional block diagram of a storage operation support apparatus 1 according to an embodiment. As illustrated in FIG. 1, the storage operation support apparatus 1 is connected to a storage device in an on-premises environment or a storage device in a cloud environment via a network. In the example of FIG. 1, the storage operation support apparatus 1 is connected to a storage device 10001 in an on-premises environment, a storage device 100c1 in a cloud environment, a user terminal 500, a supplier information server 510, and a power supply source information server 520 via networks NWL and NW. In addition, the storage device 100o2 in the on-premises environment and the storage device 100 c2 in the cloud environment are new storage devices to be newly used.

Hereinafter, the storage devices in the on-premises environment are collectively referred to as a "storage device 100 in the on-premises environment". The storage devices in the cloud environment are collectively referred to as a "storage device 100 in the cloud environment". In addition, the storage device in the on-premises environment and the storage device in the cloud environment are collectively referred to as the "storage device 100". Each of the storage devices 100 in the on-premises environment is provided with a power consumption measuring instrument that measures the power consumption of the storage device 100 in the on-premises environment. The storage operation support apparatus 1 executes a storage device monitoring program 14a (see FIG. 2) to be described later, accesses the storage device 100 in the on-premises environment, acquires the power consumption of the storage device 100 in the on-premises environment measured using the power consumption measuring instrument, and can convert the acquired power consumption into annual power consumption.

The storage device 10002 in the on-premises environment is connected to a renewable energy power generation device 200, and can supply power from the renewable energy power generation device 200. The power consumption measuring device provided in the storage device 10002 in the on-premises environment can calculate a value obtained by converting the power supplied from the renewable energy power generation device 200 consumed by the storage device 10002 in the on-premises environment into power per year (unit is [kW/year]).

The renewable energy power generation device 200 is a device (for example, a solar cell, a wind power generation device, or a biomass power generation device) that generates power using renewable energy such as sunlight, wind power, geothermal power, medium-to-small hydropower, and biomass. It can be considered that there is no environmental load due to electric power supplied by the renewable energy power generation device 200.

The user terminal 500 can access the storage operation support apparatus 1. A user of the user terminal 500 can operate the storage operation support apparatus 1 using the user terminal 500 to cause the storage operation support apparatus 1 to evaluate the storage device 100.

The supplier information server 510 stores information of the storage device 100 in the on-premises environment and information of the storage device 100 in the cloud environment. The storage operation support apparatus 1 can acquire information on the storage device 100 from the supplier information server 510 by accessing the supplier information server 510. In addition, the power supply source information server 520 is a server managed by a power company that supplies power. The power supply source information server 520 stores a value of a $CO_2$ emission coefficient (carbon dioxide emission coefficient) of power supplied to the storage device 100 in the on-premises environment. The $CO_2$ emission coefficient is a $CO_2$ emission amount (unit is "kg-$CO_2$/kWh") per 1 kWh of power supply. Note that the power supply source information server 520 may be configured so that the storage operation support apparatus 1 can acquire a numerical value necessary for estimating the amount of $CO_2$ generated for generating the power to be supplied to the storage device 100 in the on-premises environment. The power supply source information server 520 may store a numerical value other than the $CO_2$ emission coefficient (carbon dioxide emission coefficient), which can be used to estimate the amount of $CO_2$ generated to generate power to be supplied to the storage device 100 in the on-premises environment. For example, the power supply source information server 520 may store a numerical value of the annual average or the monthly average of the $CO_2$ emission coefficient (carbon dioxide emission coefficient) of power, and the storage operation support apparatus 1 may acquire and use the numerical value of the annual average or the monthly average of the $CO_2$ emission coefficient (carbon dioxide emission coefficient) from the power supply source information server 520.

The network NWL is a local area network (LAN). The network NW is a global network (for example, the Internet). The network NWL may be a wired network, a wireless network, or a wired communication path such as a universal serial bus (USB) or a wireless communication path such as Bluetooth. In addition, both the network NWL and the network NW may be global networks.

The storage operation support apparatus 1 includes an evaluation unit 11, a storage candidate evaluation unit 12, and a migration support unit 13. The evaluation unit 11 evaluates the load on the environment ($CO_2$ emission amount), cost, and performance of the storage device (storage device 100 in on-premises environment and storage device 100 in cloud environment). This makes it easy to operate the storage device in consideration of the load on the environment and the like.

The storage candidate evaluation unit 12 evaluates the load on the environment, the load on the environment ($CO_2$ emission amount), the cost, and the performance of the storage device satisfying requirement among unused storage devices so that a new storage device to be used can be easily selected. As a result, the storage candidate evaluation unit 12 facilitates the user to select an appropriate storage device in which the load on the environment, the cost, and the performance are balanced.

The migration support unit 13 evaluates whether data to be migrated of a volume of a migration source created in a storage device of the migration source can be stably copied in a case where the copy is immediately started from the volume of the migration source to the volume of the migration destination created in the storage device of the migration destination, and calculates a time when the data can be stably copied in a case where the data cannot be stably copied. This facilitates stable migration.

Note that the storage device of the migration source is referred to as a "migration source storage device", the volume of the migration source is referred to as a "migration source volume", and the data to be migrated is referred to as "migration data". In addition, the storage device of the migration destination is referred to as a "migration destination storage device", and the volume of the migration destination is referred to as a "migration destination volume".

As described above, the storage candidate evaluation unit 12 of the storage operation support apparatus 1 facilitates selection of a new storage device when the new storage device is introduced. In addition, the migration support unit 13 of the storage operation support apparatus 1 facilitates stable migration when data is migrated to a new storage device or the like. Then, the evaluation unit 11 of the storage operation support apparatus 1 facilitates the operation of the storage device in consideration of the load on the environment including before and after the migration.

<Hardware Configuration of Storage Operation Support Apparatus 1>

Figure 2:
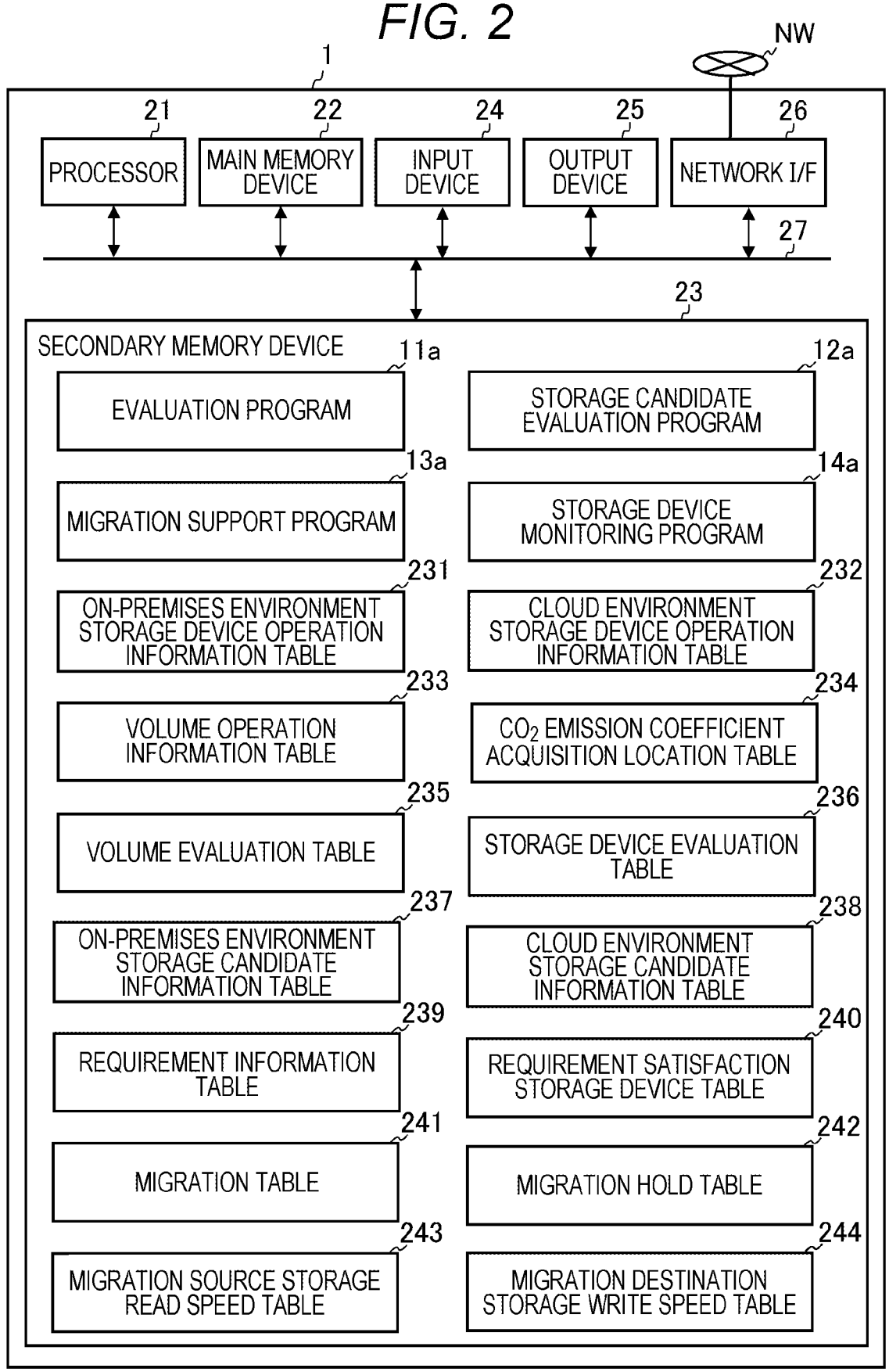
FIG. 2 is a block diagram illustrating a hardware configuration example of the storage operation support apparatus according to the embodiment.

FIG. 2 is a block diagram illustrating a hardware configuration example of the storage operation support apparatus 1. As illustrated in FIG. 2, the storage operation support apparatus 1 includes a processor 21, a main memory device 22, a secondary memory device 23, an input device 24, an output device 25, a network I/F 26, and a bus 27 that connects these devices. The storage operation support apparatus 1 can be realized by a general information processing apparatus such as a PC or a server computer.

The processor 21 reads data and a program stored in the secondary memory device 23 to the main memory device 22, and executes processing defined by the program. The evaluation unit 11 described above with reference to FIG. 1 is realized by the processor 21 reading an evaluation program 11*a* stored in the secondary memory device 23 into the main memory device 22 and executing the program. Similarly, the storage candidate evaluation unit 12 and the migration support unit 13 are realized by the processor 21 reading and executing a storage candidate evaluation program 12*a* and a migration support program 13*a* in the main memory device 22.

In the present specification, when processing is described with a sentence having the evaluation unit 11 as a functional unit as a subject, it indicates that the processor 21 is executing a program (evaluation program 11*a*) that realizes the functional unit. Similarly, in a case where processing is described with a sentence having the storage candidate evaluation unit 12 and the migration support unit 13, which are functional units, as subjects, it indicates that the processor 21 is executing a program (storage candidate evaluation program 12*a*, migration support program 13*a*) for realizing the functional units.

The main memory device 22 includes a volatile storage element such as a RAM, and stores a program executed by the processor 21 and data.

The secondary memory device 23 is a device that is a hard disk drive (HDD), a solid state drive (SSD), or the like, has a nonvolatile storage element, and stores a program, data, or the like. The secondary memory device 23 is a storage unit 23 (see FIG. 1). The secondary memory device 23 is installed with the evaluation program 11*a*, the storage candidate evaluation program 12*a*, the migration support program 13*a*, and the storage device monitoring program 14*a*. In addition, the secondary memory device 23 stores an on-premises environment storage device operation information table 231, a cloud environment storage device operation information table 232, a volume operation information table 233, a $CO_2$ emission coefficient acquisition location table 234, a volume evaluation table 235, a storage device evaluation table 236, an on-premises environment storage candidate information table 237, a cloud environment storage candidate information table 238, a requirement information table 239, a requirement satisfaction storage device table 240, a migration possible table 241, a migration hold table 242, a migration source storage read speed table 243, and a migration destination storage write speed table 244.

The on-premises environment storage device operation information table 231 stores information regarding the storage device 100 in the on-premises environment in use although details will be described later with reference to FIG. 3.

The cloud environment storage device operation information table 232 stores information on the storage device 100 in the cloud environment in use although details will be described later with reference to FIG. 4.

The volume operation information table 233 stores information on the volume created in the storage device 100 in use although details will be described later with reference to FIG. 5.

Although the details will be described later with reference to FIG. 6, the $CO_2$ emission coefficient acquisition location table 234 stores information on the location of the power supply source information server 520 that stores a value of a $CO_2$ emission coefficient of the power to be supplied to the storage device 100 in the on-premises environment.

The volume evaluation table 235 stores information on the evaluation result of the volume in use although details will be described later with reference to FIG. 7.

The storage device evaluation table 236 stores information on an evaluation result of the storage device 100 in use although details will be described later with reference to FIG. 8.

Although details will be described later with reference to FIG. 9, the on-premises environment storage candidate information table 237 stores information regarding an unused storage device in the on-premises environment.

The cloud environment storage candidate information table 238 stores information regarding an unused storage device in the cloud environment although details will be described later with reference to FIG. 10.

The requirement information table 239 stores information regarding requirement of a new storage device although details will be described later with reference to FIG. 11.

Although details will be described later with reference to FIG. 12, the requirement satisfaction storage device table 240 stores information on an evaluation result for a storage device that is a candidate for a new storage that satisfies the requirement.

The migration possible table 241 stores information regarding a volume on which stable migration is immediately possible although details will be described later with reference to FIG. 13.

The migration hold table 242 stores information on evaluation of a volume on which stable migration is difficult to immediately perform although details will be described later with reference to FIG. 14.

The migration source storage read speed table 243 stores information regarding a temporal change of the data reading speed of the migration source storage device although the details will be described later with reference to FIG. 15.

The migration destination storage write speed table 244 stores information regarding a temporal change of the data writing speed of the migration destination storage device although details will be described later with reference to FIG. 16.

The input device 24 is a device that receives a user's operation such as a keyboard or a mouse, and acquires information input by the user's operation. The output device 25 is a device that outputs information, such as a display, and presents the information to the user by display on a screen, for example. Note that the storage operation support apparatus 1 may include a touch panel that also serves as the input device 24 and the output device 25.

The network I/F 26 is an interface (transmission/reception device) that can transmit/receive data to/from devices such as the supplier information server 510, the power supply source information server 520, and the user terminal 500 via the network NW. The storage operation support apparatus 1 can transmit and receive data to and from devices such as the supplier information server 510, the power supply source information server 520, and the user terminal 500 connected to the networks NWL and NW using the network I/F 26.

The supplier information server 510, the power supply source information server 520, and the user terminal 500 can be realized by hardware resources similar to those of the storage operation support apparatus 1. That is, the supplier information server 510, the power supply source information server 520, and the user terminal 500 can be realized by a general information processing apparatus such as a PC or a server computer, for example, similarly to the storage operation support apparatus 1.

<Various Data Structures>

Next, a data configuration of various data used in the storage operation support apparatus 1 will be described with reference to FIGS. 3 to 16. Note that the configuration of the fields of the on-premises environment storage device operation information table 231, the cloud environment storage device operation information table 232, the volume operation information table 233, the $CO_2$ emission coefficient acquisition location table 234, the volume evaluation table 235, the storage device evaluation table 236, the on-premises environment storage candidate information table 237, the cloud environment storage candidate information table 238, the requirement information table 239, the requirement satisfaction storage device table 240, the migration possible table 241, the migration hold table 242, the migration source storage read speed table 243, and the migration destination storage write speed table 244 described below with reference to FIGS. 3 to 16 is an example and can be changed as appropriate.

FIG. 3 is a diagram illustrating an example of a data configuration of the on-premises environment storage device operation information table 231. The on-premises environment storage device operation information table 231 illustrated in FIG. 3 stores records having a storage device ID 301, an extraction date and time 302, an installation region 303, a product name 304, a power supply source 305, a power supply source $CO_2$ emission coefficient 306, annual power consumption 307, renewable energy annual power consumption 308, IOPS 309 of the storage device, a capacity 310, a compression rate 311, a price 312, and a service life 313 as fields.

The storage device ID 301 is a field for storing an ID of the storage device 100 in the on-premises environment. The extraction date and time 302 is a field for storing the date and time when the record is generated.

The installation region 303 is a field for storing a name of a region in which the storage device 100 in the on-premises environment is installed. The product name 304 is a field for storing a product name of the storage device 100 in the on-premises environment.

The power supply source 305 is a field that stores a name of a power supply source (for example, electric power company) that supplies power to the storage device 100 in the on-premises environment.

The power supply source $CO_2$ emission coefficient 306 is a field for storing a $CO_2$ emission coefficient of power supplied to the storage device 100 in the on-premises environment acquired by the storage operation support apparatus 1 from the power supply source of the power supply source 305.

The annual power consumption 307 is a field for storing the annual power consumption of the storage device 100 in the on-premises environment. The value of the annual power consumption 307 is a value of the annual power consumption of the storage device 100 in the on-premises environment calculated from the value of the power consumption per unit time of the storage device 100 in the on-premises environment measured by a power consumption measuring instrument acquired by the storage operation support apparatus 1 accessing the storage device 100 in the on-premises environment by executing the storage device monitoring program 14a (see FIG. 2).

The renewable energy annual power consumption 308 is a field that stores a value obtained by converting the power of the renewable energy supplied from the renewable energy power generation device 200 (see FIG. 1), which is used by the storage device 100 in the on-premises environment, into power used per year (annual power consumption). The storage operation support apparatus 1 executes the storage device monitoring program 14a (see FIG. 2) to access and acquire the value of the renewable energy annual power consumption 308 in the storage device 100 in the on-premises environment.

The IOPS 309 of the storage device is a field for storing IOPS of the storage device. The storage operation support apparatus 1 executes the storage device monitoring program 14a (see FIG. 2), accesses the storage device 100 in the on-premises environment, and can acquire the value of the IOPS 309 of the storage device.

The capacity 310 is a field for storing the storage capacity of the storage device 100 in the on-premises environment. The compression rate 311 is a field for storing an average data compression rate of the storage device 100 in the on-premises environment. In a case where the storage device 100 in the on-premises environment does not have the data compression function, the value of the compression rate 311 is 1.

Figure 17:
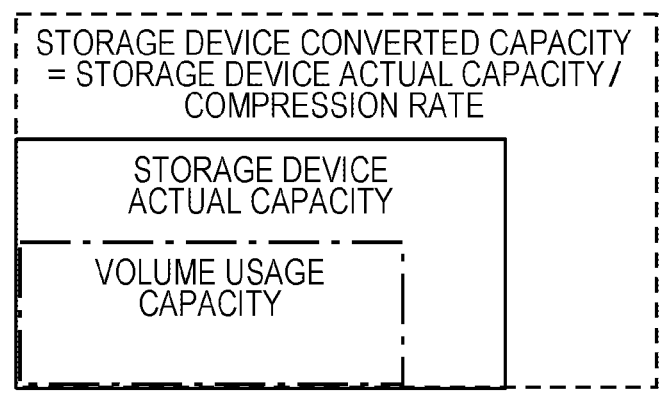
FIG. 17 is an explanatory diagram for explaining a compression rate and a conversion capacity.

FIG. 17 is an explanatory diagram for explaining a compression rate and a conversion capacity. As illustrated in FIG. 17, the storage operation support apparatus 1 can calculate a conversion capacity ("storage device conversion capacity" illustrated in FIG. 17) of the storage device obtained by dividing a physical actual capacity ("storage device actual capacity" illustrated in FIG. 17) of the storage device by the compression rate, and can calculate the amount of data (that is, conversion capacity) that can be substantially stored in the storage device. In the on-premises environment storage device operation information table 231 illustrated in FIG. 3, a value of the capacity 310 is a physical actual capacity of the storage device. The conversion capacity of the storage device is a value (conversion capacity=value of capacity 310/compression rate 311) obtained by dividing the value of the capacity 310 by the value of the compression rate 311. Note that a value obtained by multiplying a conversion constant that is a predetermined value (for example, 0.9) by the value of the capacity 310 and the compression rate may be used as the value of the conversion capacity (conversion capacity=conversion constant×value of capacity 310/compression rate 311).

The price 312 is a field for storing the price of the storage device 100 in the on-premises environment. The value of the price 312 is desirably a price at the time of purchase of the storage device 100 in the on-premises environment, and may be a current price of the storage device 100 in the on-premises environment.

The service life 313 is a field for storing the service life of the storage device 100 in the on-premises environment.

The storage operation support apparatus 1 creates and stores the record of the on-premises environment storage device operation information table 321 described above at a predetermined timing as follows, for example. That is, the storage operation support apparatus 1 executes the storage device monitoring program 14a (see FIG. 2) at a predetermined timing (for example, every week) to acquire the values of the power supply source $CO_2$ emission coefficient 306, the annual power consumption 307, and the IOPS 309 of the storage device. Then, the storage operation support apparatus 1 sets the acquired date and time as the value of the extraction date and time 302, and acquires the values of the installation region 303, the product name 304, the power supply source 305, the capacity 310, the compression rate 311, the price M, and the service life 313 from the record in which the storage device ID is the same as the storage device ID of the record being created among the records previously created in the on-premises environment storage device operation information table 321. A new record in which the values of the extraction date and time 302 to the service life 313 acquired in this manner are associated with the storage device ID is stored in the on-premises environment storage device operation information table 321.

Note that the record in which the value of the storage device ID 301 is "Ref1" is a record that stores information of a storage device (reference storage device) in a standard on-premises environment. The reference storage device may be a storage device in an on-premises environment having minimum performance and capacity, and information on the storage device in the on-premises environment having minimum performance and capacity may be stored in a record in which the value of the storage device ID 301 is "Ref1". In addition, the reference storage device may be a storage device having average performance and capacity, and information of a storage device in an on-premises environment having average performance and capacity may be stored in a record of which the value of the storage device ID 301 is "Ref1".

FIG. 4 is a diagram illustrating an example of a data configuration of the cloud environment storage device operation information table 232. The cloud environment storage device operation information table 232 illustrated in FIG. 4 stores records having a storage device ID 401, an extraction date and time 402, a service name 403, an annual $CO_2$ emission amount per capacity 404, a monthly usage fee per capacity 405, a volume usage capacity 406, and a maximum storage capacity 407 as feeds.

The storage device ID 401 is a field for storing an ID of the storage device 100 in the cloud environment. The extraction date and time 402 is a field for storing the date and time when the record is generated.

The service name 403 is a field for storing the name of the cloud service of the storage device 100 in the cloud environment. The annual $CO_2$ emission amount per capacity 404 is a field for storing an annual $CO_2$ emission amount per capacity published by an organization (company or the like) that manages the storage device 100 in the cloud environment.

The monthly usage fee per capacity 405 is a field for storing a monthly usage fee per capacity published by an organization (company or the like) that manages the storage device 100 in the cloud environment. The volume usage capacity 406 is a field for storing the total used capacity of the volumes created in the storage device 100 in the cloud environment.

The maximum storage capacity 407 is a field for storing the maximum capacity of the storage device 100 in the on-premises environment released by an organization (company or the like) that manages the storage device 100 in the cloud environment.

Note that the record in which the value of the storage device ID 401 is "Ref1" is a record that stores information of a storage device (reference storage device) in a standard cloud environment. The reference storage device may be a storage device in a cloud environment having minimum performance and capacity, and information on the storage device in the cloud environment having minimum performance and capacity may be stored in a record in which the value of the storage device ID 401 is "Ref1". In addition, the reference storage device may be a storage device having average performance and capacity, and information on the storage device in the cloud environment having average performance and capacity may be stored in a record in which the value of the storage device ID 401 is "Ref1".

FIG. 5 is a diagram illustrating an example of a data configuration of the volume operation information table 233. In the volume operation information table 233 illustrated in FIG. 5, records having a volume ID 501, an extraction date and time 502, a storage device ID 503, a volume IOPS 504, and a volume capacity 505 as feeds are stored.

The volume ID 501 is a field for storing an ID of a volume created in the storage device 100 in the on-premises environment or the storage device 100 in the cloud environment. The extraction date and time 502 is a field for storing the date and time when the record is generated.

The storage device ID 503 is a field for storing an ID of the storage device in which the volume is created. The volume IOPS 504 is a field for storing IOPS of the volume. The value of the volume IOPS 504 can be acquired by the storage operation support apparatus 1 by executing the storage device monitoring program 14a (see FIG. 2) and accessing the storage device.

The volume capacity 505 is a field for storing the capacity of the volume.

FIG. 6 is a diagram illustrating an example of a data configuration of the $CO_2$ emission coefficient acquisition location table 234. The $CO_2$ emission coefficient acquisition location table 234 illustrated in FIG. 6 stores a record in which a power supply source 601 and a location 602 are set as feeds. The power supply source 601 is a field that stores a name of an organization (for example, company) that supplies power to the storage device 100 in the on-premises environment. The location 602 is a field for storing a location (URL or IP address) on the network NW of an organization (for example, company) that supplies power to the storage device 100 in the on-premises environment.

FIG. 7 is a diagram illustrating an example of a data configuration of the volume evaluation table 235. The volume evaluation table 235 illustrated in FIG. 7 stores records having a volume ID 701, an evaluation date and time 702, a product name/service name 703, a total score 704, a previous total score 705, a $CO_2$ emission amount 706, a cost 707, IOPS 708, an environment score 709, a cost score 710, and a performance score 711 as feeds.

The volume ID 701 is a field for storing an ID of a volume. The evaluation date and time 702 is a field for storing the date and time when the record is generated.

The product name/service name 703 is a field for storing a product name (when storage device in which volume is created is on-premises environment) or a service name (when storage device in which volume is created is cloud environment) of the storage device in which the volume is created.

The total score 704, the previous total score 705, the environment score 709, the cost score 710, and the performance score 711 are evaluation values obtained by evaluating the volume by the storage operation support apparatus 1.

The total score 704 is a field for storing the total score for the volume calculated using the value of the environment score 709, the value of the cost score 710, and the value of the performance score 711 calculated by the storage operation support apparatus 1.

The previous total score 705 is a field for storing the total score for the most recently calculated volume before the total score 704 is calculated.

The $CO_2$ emission amount 706 is a field for storing a volume of $CO_2$ emission amount converted per year. The cost 707 is a field for storing a cost per year of the volume. The IOPS 708 is a field for storing IOPS of a volume. The value of IOPS 708 can be acquired by the storage operation support apparatus 1 executing the storage device monitoring program 14a (see FIG. 2), accessing a volume, and reading and writing a predetermined amount of data, for example.

The environment score 709 is a field for storing the environment score calculated by the storage operation support apparatus 1 using the value of the $CO_2$ emission amount 706. The cost score 710 is a field for storing the cost score calculated by the storage operation support apparatus 1 using the value of the cost 707. The performance score 711 is a field for storing a value of the performance score calculated by the storage operation support apparatus 1 using the value of IOPS 708.

FIG. 8 is a diagram illustrating an example of a data configuration of the storage device evaluation table 236. The storage device evaluation table 236 illustrated in FIG. 8 stores records having a storage device ID 801, an evaluation date and time 802, a product name/service name 803, a total score 804, a previous total score 805, a $CO_2$ emission amount 806, a cost 807, IOPS 808, an environment score 809, a cost score 710, and a performance score 711 as fields.

The storage device ID 801 is a field for storing an ID of a storage device. The evaluation date and time 802 is a field for storing the date and time when the record is generated. Here, since the date and time when the record is generated is almost the same as the date and time when the total score 804 is calculated, the value of the evaluation date and time 802 is regarded as the same as the date and time when the value of the total score 804 is calculated.

The product name/service name 803 is a field for storing a product name (when storage device is in on-premises environment) or a service name (when storage device is in cloud environment) of the storage device.

The total score 804, the previous total score 805, the environment score 809, the cost score 810, and the performance score 811 are evaluation values obtained by evaluating the storage device by the storage operation support apparatus 1.

The total score 804 is a field for storing the total score for the storage device calculated using the value of the environment score 809, the value of the cost score 810, and the value of the performance score 811 calculated by the storage operation support apparatus 1.

The previous total score 805 is a field for storing the total score for the storage device calculated most recently before the total score 804 is calculated.

The $CO_2$ emission amount 806 is a field for storing a $CO_2$ emission amount converted per year of the storage device. The cost 807 is a field for storing a cost per year of the storage device. The IOPS 808 is a field for storing IOPS of the storage device. The value of IOPS 808 can be acquired by the storage operation support apparatus 1 executing the storage device monitoring program 14a (see FIG. 2), accessing the storage device, and reading and writing a predetermined amount of data, for example.

The environment score 809 is a field for storing the environment score calculated by the storage operation support apparatus 1 using the value of the $CO_2$ emission amount 806. The cost score 810 is a field for storing the cost score calculated by the storage operation support apparatus 1 using the value of the cost 807. The performance score 811 is a field for storing a value of the performance score calculated by the storage operation support apparatus 1 using the value of the IOPS 808.

FIG. 9 is a diagram illustrating an example of a data configuration of the on-premises environment storage candidate information table 237. The on-premises environment storage candidate information table 237 stores information regarding an unused storage device of the on-premises environment. The on-premises environment storage candidate information table 237 illustrated in FIG. 9 stores a record in which a candidate storage ID 901, a vendor name 902, a product name 903, a price 904, a service life 905, storage annual power consumption 906, IOPS 907, a maximum capacity 908, a compression rate 909, the number of redundant data 910, and a reduction function 911 are set as feeds.

The candidate storage ID 901 is a field for storing an ID of an unused storage device in the on-premises environment. The vendor name 902 is a field for storing a vendor name of an unused storage device in the on-premises environment. The product name 903 is a field for storing a product name of an unused storage device in the on-premises environment.

The price 904 is a field for storing a price of an unused storage device in the on-premises environment. The service life 905 is a field for storing a service life of an unused storage device in the on-premises environment. The storage annual power consumption 906 is a field for storing the annual power consumption of an unused storage device in an on-premises environment. The IOPS 907 is a field for storing IOPS of an unused storage device in an on-premises environment. The maximum capacity 908 is a field for storing a maximum capacity of an unused storage device in an on-premises environment. The compression rate 909 is a field for storing a compression rate of data of an unused storage device in an on-premises environment. The number of redundant data 910 is a field for storing the number of redundant data copies that can be taken by an unused storage device in an on-premises environment. The redundant data copy number is the number of mirrors of the backup related to the type such as Raid that can be set.

The reduction function 911 is a field for storing the presence or absence of handling of the "apparent migration time reduction function" of an unused storage device in an on-premises environment. In the storage device corresponding to the "apparent migration time reduction function", the value of the reduction function 911 is "present". Meanwhile, in the storage device that does not correspond to the "apparent migration time reduction function", the value of the reduction function 911 is "absent".

Figure 18:
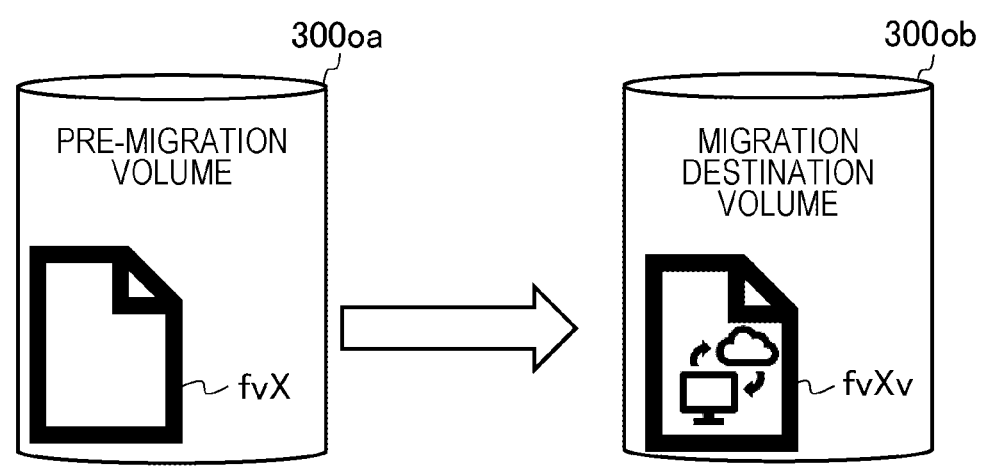
FIG. 18 is an explanatory diagram for explaining an apparent migration time reduction function.

FIG. 18 is an explanatory diagram illustrating the apparent migration time reduction function. In the apparent migration time reduction function, as illustrated in FIG. 18, when data is copied from a pre-migration volume 300oa to a migration destination volume 300ob and migrated, display information (for example, icon or file name) indicating the presence of the data to be copied (migrated) is copied to the migration destination volume 300ob for each piece of data to be copied (migrated) by the device executing the copy to the device (for example, user terminal 500) accessing the migration destination volume 300ob. Then, when the device (for example, user terminal 500) that accesses the migration destination volume 300ob accesses the display information to use the data to be copied (migrated), in a case where the copy (migration) of the data to be copied (migrated) is not completed, the function is to copy (migrate) the data corresponding to the accessed display information in preference to the copy of other data. By the apparent migration time reduction function, it seems that the copy (migration) of the data is completed within a predetermined migration reduction time from the user of the device (for example, user terminal 500) accessing the migration destination volume 300ob. Therefore, when the storage device supports the apparent migration time reduction function, the storage operation support apparatus 1 can regard the time required for migration (copy) of data from the pre-migration volume to the migration destination volume as the migration reduction time. The migration reduction time is a predetermined length of time (for example, 1 minute) during which it can be considered that copying of display information (for example, icon or file name) indicating the presence of data to be copied (migrated) is completed by the apparent migration time reduction function.

FIG. 10 is a diagram illustrating an example of a data configuration of the cloud environment storage candidate information table 238. The cloud environment storage candidate information table 238 stores information on an unused storage device in the cloud environment. In the cloud environment storage candidate information table 238 illustrated in FIG. 10, records having a candidate storage ID 1001, a vendor name 1002, a service name 1003, a monthly usage fee 1004 per capacity, an annual $CO_2$ emission amount 1005 per capacity, IOPS 1006, and a maximum capacity 1007 as feeds are stored.

The candidate storage ID 1001 is a field for storing an ID of an unused storage device in the cloud environment. The vendor name 1002 is a field for storing a vendor name of an unused storage device in the cloud environment. The service name 1003 is a field for storing a service name of an unused storage device in the cloud environment.

Each of the monthly usage fee 1004 per capacity, the annual $CO_2$ emission amount 1005 per capacity, the IOPS 1006, and the maximum capacity 1007 is a field similar to the field of the cloud environment storage device operation information table 232 illustrated in FIG. 4, and stores a value for an unused storage device in the cloud environment.

FIG. 11 is a diagram illustrating an example of a data configuration of the requirement information table 239. The requirement information table 239 illustrated in FIG. 11 stores records in which a set date and time 1101, a type 1102, an importance balance 1103, an assumed capacity 1104, IOPS 1105, a response time 1106, throughput 1107, an apparent migration reduction function 1108, a reliability 1109, a target $CO_2$ reduction amount 1110, a $CO_2$ emission upper limit 1111, and a power consumption upper limit 1112 are set as feeds. The values of these fields are values input to an evaluation screen described later with reference to FIG. 23 before the storage operation support apparatus 1 executes storage candidate evaluation processing described later with reference to FIG. 24. These fields are information (also referred to as "requirement information") of requirements for a new storage device to be newly introduced.

FIG. 12 is a diagram illustrating an example of a data configuration of the requirement satisfaction storage device table 240. The requirement satisfaction storage device table 240 stores evaluation information for a storage device (referred to as a "candidate storage device") that satisfies a requirement among unused storage devices. The requirement satisfaction storage device table 240 illustrated in FIG. 12 stores records in which a candidate storage ID 1201, a product name/service name 1202, an evaluation date and time 1203, a $CO_2$ emission amount 1204, a cost 1205, IOPS 1206, a total score 1207, an environment score 1208, a cost score 1209, and a performance score 1210 are set as feeds. Since these fields are similar to the fields (storage device ID 801, evaluation date and time 802, product name/service name 803, total score 804, $CO_2$ emission 806, cost 807, IOPS 808, environment score 809, cost score 710, and performance score 711) of the storage device evaluation table 236 illustrated in FIG. 8, the description of these fields is omitted.

FIG. 13 is a diagram illustrating an example of a data configuration of the migration possible table 241. The migration possible table 241 stores volume migration information determined by the storage operation support apparatus 1 to be immediately migratable in the migration support processing of the storage operation support apparatus 1. The migration possible table 241 illustrated in FIG. 13 stores a record having a migration ID 1301, a migration source storage ID 1302, a migration source volume ID 1302, a migration destination storage ID 1304, a migration destination volume ID 1305, a migration time reduction function 1306, an estimated migration time 1307, and an execution instruction 1308 as feeds.

The migration ID 1301 is a field for storing an ID for identifying a set of the migration source volume and the migration destination volume.

The migration source storage ID 1302 is a field for storing a storage device ID of the migration source storage device. The migration source volume ID 1303 is a field for storing a volume ID of the migration source volume.

The migration destination storage ID 1304 is a field for storing a storage device ID of the migration destination storage device. The migration destination volume ID 1305 is a field for storing a volume ID of the migration destination volume.

The migration time reduction function 1306 is a field for storing information on whether or not the apparent migration time reduction function can be used for the migration of the record. When the value of the migration time reduction function 1303 is "present", the apparent migration time reduction function can be used for migration of the information of the record. Meanwhile, when the value of the migration time reduction function 1303 is "absent", the apparent migration time reduction function cannot be used for the migration of the record.

The estimated migration time 1307 is a field that stores the time required for the migration of the information of the record calculated by the storage operation support apparatus 1.

The execution instruction 1308 is a field for storing information on the presence or absence of an instruction to execute the migration of the information of the record.

FIG. 14 is a diagram illustrating an example of a data configuration of the migration hold table 242. The migration hold table 242 stores volume migration information determined that the storage operation support apparatus 1 cannot immediately migrate in the migration support processing of the storage operation support apparatus 1. The migration hold table 242 illustrated in FIG. 14 stores a record in which a migration ID 1401, a migration source storage ID 1402, a migration source volume ID 1402, a migration destination storage ID 1404, a migration destination volume ID 1405, a migration time reduction function 1406, a migration possible time 1407, and an execution instruction 1408 are set as feeds.

The migration ID 1401 is a field for storing an ID for identifying a set of the migration source volume and the migration destination volume.

The migration source storage ID 1402 is a field for storing a storage device ID of the migration source storage device. The migration source volume ID 1403 is a field for storing a volume ID of the migration source volume.

The migration destination storage ID 1404 is a field for storing a storage device ID of the migration destination storage device. The migration destination volume ID 1405 is a field for storing a volume ID of the migration destination volume.

The migration time reduction function 1406 is a field for storing information on whether or not the apparent migration time reduction function can be used for the migration of the record. When the value of the migration time reduction function 1403 is "present", the apparent migration time reduction function can be used for migration of the information of the record. Meanwhile, when the value of the migration time reduction function 1403 is "absent", the apparent migration time reduction function cannot be used for the migration of the record.

The migration possible time 1407 is information on a time that can be estimated to enable the migration of the information of the record calculated by the storage operation support apparatus 1.

The execution instruction 1408 is a field for storing information on the presence or absence of an instruction to execute the migration of the information of the record.

FIG. 15 is a diagram illustrating an example of a data configuration of the migration source storage read speed table 243. The migration source storage read speed table 243 stores information in which the ID of the migration source storage device, the time, and the data reading speed of the migration source storage device are associated with each other. The migration source storage read speed table 243 illustrated in FIG. 15 stores a record in which a migration source storage ID 1501, a time 1502, and a read speed 1503 are feeds.

The migration source storage ID 1501 is a field for storing an ID of the migration source storage device.

The time 1502 is a field for storing a time (24:00 system). The read speed 1503 is a field for storing the data reading speed of the migration source storage device at the time 1502. The value of the read speed 1503 is a value acquired by the storage operation support apparatus 1 executing the storage device monitoring program 14*a* (see FIG. 2) at the time 1502, accessing the storage device, and reading a predetermined amount of data, for example. As the read speed 1503, an average value of values measured for each predetermined day may be used. In addition, the storage operation support apparatus 1 may execute the storage device monitoring program 14*a* (see FIG. 2) at the time 1502 every day to access the storage device and read a predetermined amount of data, for example, thereby acquiring the data reading speed at the time 1502 and setting the average value of the values of the data reading speed acquired in the last several days as the value of the read speed 1503.

FIG. 16 is a diagram illustrating an example of a data configuration of the migration destination storage write speed table 244. The migration destination storage write speed table 244 stores information in which the ID of the migration destination storage device, the time, and the data writing speed of the migration destination storage device are associated with each other. In the migration destination storage write speed table 244 illustrated in FIG. 16, a record having a migration destination storage ID 1601, a time 1602, and a write speed 1603 as feeds is stored.

The migration destination storage ID 1601 is a field for storing an ID of the migration destination storage device. The time 1602 is a field for storing a time (24:00 system).

The write speed 1603 is a field for storing the data writing speed of the migration destination storage device at the time 1602. The value of the write speed 1603 is a value acquired by the storage operation support apparatus 1 executing the storage device monitoring program 14a (see FIG. 2) at the time 1602, accessing the storage device, and reading a predetermined amount of data, for example. As the write speed 1603, an average value of values measured for each predetermined day may be used. In addition, the storage operation support apparatus 1 may acquire the data writing speed at the time 1602 by executing the storage device monitoring program 14a (see FIG. 2) at the time 1602 every day to access the storage device and read, for example, a predetermined amount of data, and set the average value of the values of the data writing speed acquired in the last several days to the value of the write speed 1603.

The on-premises environment storage device operation information table 231, the cloud environment storage device operation information table 232, the on-premises environment storage candidate information table 237, and the cloud environment storage candidate information table 238 are "storage device information" that stores information on the state of the storage device.

The "in-use storage device specific information" is a storage device ID stored in the on-premises environment storage device operation information table 231 and the cloud environment storage device operation information table 232.

The candidate storage ID stored in the requirement satisfaction storage device table 240 is "candidate storage device specific information" that can specify a candidate storage device that satisfies the requirement included in the requirement information.

The on-premises environment storage candidate information table 237 (see FIG. 9) and the cloud environment storage candidate information table 238 (see FIG. 10) are "unused storage device usage information" in which "unused storage device specific information" for specifying an unused storage device and "unused storage device specification information" for storing the specification of the unused storage device in association with each other are associated with each other. Here, the value of the candidate storage ID 901 in the on-premises environment storage candidate information table 237 (see FIG. 9) is an ID of an unused storage device in the on-premises environment and is "unused storage device specific information". In addition, the value of the candidate storage ID 1001 in the cloud environment storage candidate information table 238 (see FIG. 10) is an ID of an unused storage device in the cloud environment and is "unused storage device specific information".

The vendor name 902 to the reduction function 911 of the on-premises environment storage candidate information table 237 and the vendor name 1002 to the maximum capacity 1007 of the cloud environment storage candidate information table 238 are "unused storage device specification information" that stores the specifications of the unused storage devices in association with each other.

The requirement satisfaction storage device table 240 (see FIG. 12) is the candidate storage device evaluation information. The value of the candidate storage ID 1201 of the requirement satisfaction storage device table 240 is the candidate storage specific information.

<<Processing Procedure>>

Next, a processing procedure of the storage operation support apparatus 1 will be described. The user operates the user terminal 500 to cause the user terminal 500 to access the storage operation support apparatus 1. When accessed from the user terminal 500, the storage operation support apparatus 1 transmits evaluation screen information to the user terminal 500. The evaluation screen information includes information on the configuration of the evaluation screen and information indicating that the evaluation screen is displayed on the user terminal 500. As described below, the evaluation screen is configured to be able to input a condition for a storage device to be newly used. Note that the user of the storage operation support apparatus 1 may input an instruction to display the evaluation screen from the input device 24 to the storage operation support apparatus 1, and the storage operation support apparatus 1 may display the evaluation screen on the output device 25 (monitor).

Figure 19:
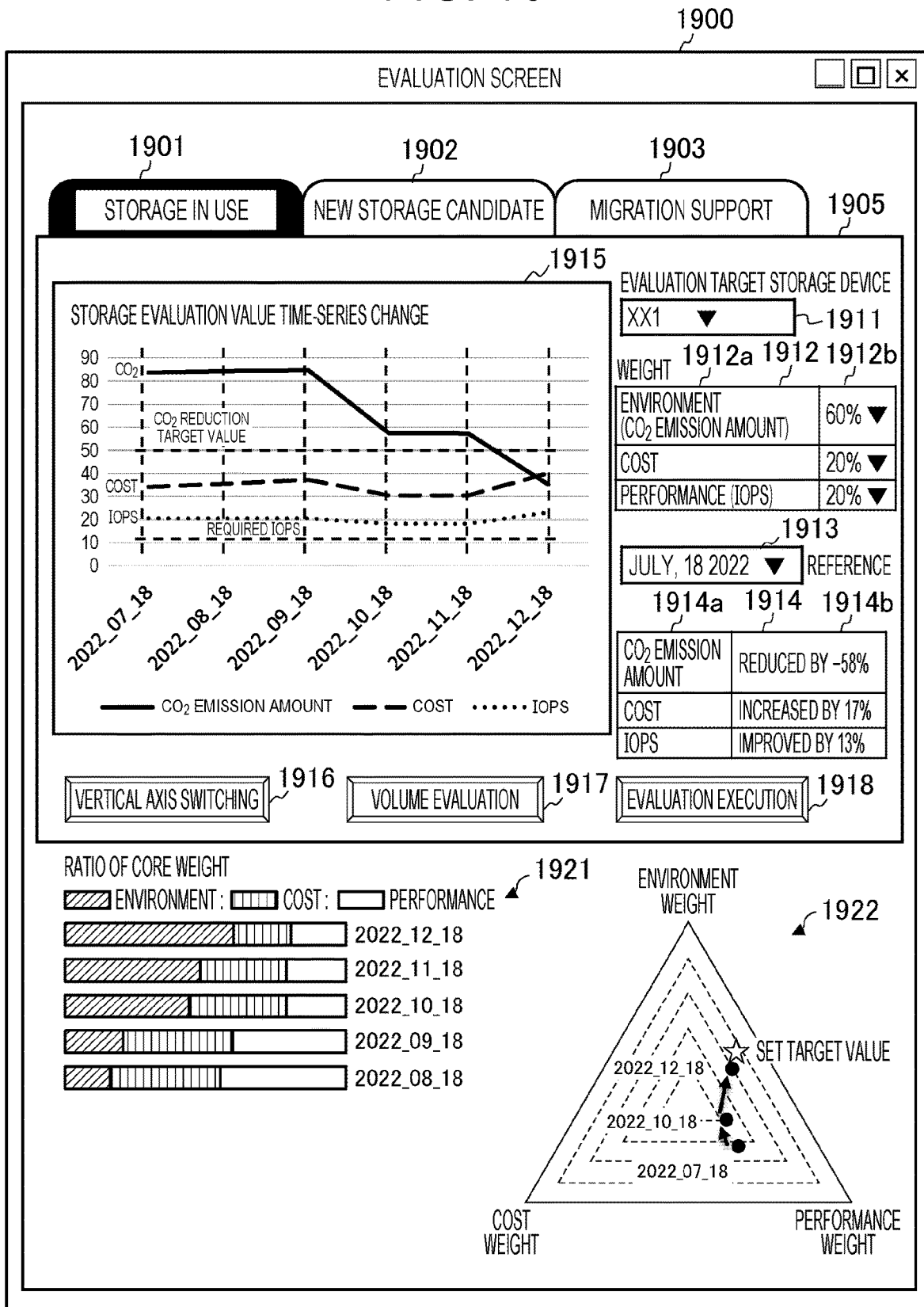
FIG. 19 is an explanatory diagram illustrating an example of an evaluation screen.

FIG. 19 is an explanatory diagram illustrating an example of an evaluation screen 1900 displayed on the user terminal 500 or the output device 25 (monitor) of the storage operation support apparatus 1. The evaluation screen 1900 illustrated in FIG. 19 includes three tabs of a storage evaluation tab 1901, a new storage candidate tab 1902, and a migration support tab 1903, and a display area 1905 in which a content drawn therein is changed according to a tab selected by clicking or the like among these tabs.

In a case where the storage evaluation tab 1901 is selected, an input field of a condition when evaluation processing of evaluating the currently used storage is executed is drawn in the display area 1905. In a case where the new storage candidate tab 1902 is selected (see FIG. 23), an input field or the like for receiving an input of a requirement of the new storage is drawn in the display area 1905. In addition, in a case where the migration support tab 1903 is selected (see FIG. 27), in the display area 1905, information regarding migration of the migration source volume is drawn at the time of a migration operation of copying information included in the migration source volume of the migration source storage to the migration destination volume of the migration destination storage.

FIG. 19 illustrates an example of the evaluation screen 1900 in a case where the storage evaluation tab 1901 is selected. The storage evaluation tab 1901 of FIG. 19 has a black background to indicate that it is selected.

As illustrated in FIG. 19, the display area 1905 of the evaluation screen 1900 when the storage evaluation tab 1901 is selected includes an evaluation target storage device selection button 1911, a score weight setting table 1912, a reference date selection button 1913, a relative score display table 1914, a storage device time-series evaluation graph 1915, a value switching button 1916, a storage device volume switching button 1917, an evaluation execution button 1918, a horizontal bar graph 1921, and a balance graph 1922.

The evaluation target storage device selection button 1911 is a button for selecting a storage device to be evaluated. When the evaluation target storage device selection button 1911 is pressed, a list of IDs of storage devices in use is displayed, and IDs of storage devices in use can be selected. Here, the ID of the storage device in use is the ID of the storage device of the record stored in the on-premises environment storage device operation information table 231 and the cloud environment storage device operation information table 232. Note that the ID "Refl" of the reference storage device is excluded from the ID of the storage device in use in the list of the IDs of the storage devices in use.

The score weight setting table 1912 is a table used to input values of the score weights (environment score weight, cost score weight, and performance score weight). Although the details will be described later, the storage operation support apparatus 1 calculates a total score by applying the value to an expression "total score=environment score weight×environment score+cost score weight×cost score+performance score weight×performance score". In the column 1912a of the score weight setting table 1912, "environment" indicating the environment score weight, "cost" indicating the cost score weight, and "performance (IOPS)" indicating the performance score weight are drawn. In the column 1912b, a value input field for inputting a value for the column 1912a is drawn. When the value input field is clicked, the value of the score weight can be input.

The reference date selection button 1913 is a button for setting a reference date for calculating a relative value of the evaluation value ($CO_2$ emission amount as a value for evaluating environment, price per year of the evaluation target storage device as a value for evaluating cost, and IOPS value of the target storage device as a value for evaluating performance) of the evaluation target storage device calculated by the storage operation support apparatus 1 executing the evaluation processing illustrated in the relative score display table 1914. The storage operation support apparatus 1 calculates the relative value by an expression "relative value=evaluation value calculated in the evaluation processing/evaluation value calculated in the evaluation processing on the reference date×100".

The relative score display table 1914 is a table indicating relative values. In a column 1914a of the relative score display table 1914, "environment" indicating the relative value of environment, "cost" indicating the relative value of cost, and "performance (IOPS)" indicating the relative value of performance are drawn. In a column 1914b, a relative value with respect to the column 1914a is drawn. In the column 1914b, a relative value calculated last time is indicated as a default. When the evaluation execution button 1918 is pressed, the value in the column 1914b is updated to the calculated relative value on the basis of the value calculated by executing the evaluation processing.

The storage device time-series evaluation graph 1915 is a line graph of values (vertical axes are the following two types, 1: $CO_2$ emission which is value for the environment score, cost, and IOPS as evaluation values, and 2: environment score, cost score, and performance score as scores) for evaluating the storage device to be evaluated with respect to time. In the example of FIG. 19, the vertical axis of the storage device time-series evaluation graph 1915 is 2: score.

The value switching button 1916 is a button for inputting switching of the storage device time-series evaluation graph 1915 between a graph in which the vertical axis is 1: evaluation value and a graph in which the vertical axis is 2: score. Each time the value switching button 1916 is pressed, the storage device time-series evaluation graph 1915 is switched.

When pressed, the storage device volume switching button 1917 is a button for inputting switching between display of the storage device time-series evaluation graph 1915 and display (see FIG. 20) of the storage device evaluation table 236 (see FIG. 8) in which the value for evaluating the volume created in the evaluation target storage device is stored. Each time the storage device volume switching button 1917 is pressed, these displays are switched.

The evaluation execution button 1918 is a button for inputting an instruction for the storage operation support apparatus 1 to execute the evaluation processing described below using the ID of the storage device to be evaluated selected using the evaluation target storage device selection button 1911 and the value of the score weight (environment score weight, cost score weight, and performance score weight) input to the score weight setting table 1912 as inputs.

When the evaluation execution button 1918 is pressed, the fact that the evaluation processing is executed is transmitted to the storage operation support apparatus 1 using the ID of the storage device to be evaluated selected using the evaluation target storage device selection button 1911 and the value of the score weight (environment score weight, cost score weight, and performance score weight) input to the score weight setting table 1912 as inputs. Upon reception, the storage operation support apparatus 1 executes the evaluation processing described below using the received ID of the storage device to be evaluated (evaluation target storage device) and the value of the score weight (environment score weight, cost score weight, and performance score weight) as inputs. In the description of the evaluation processing, the "evaluation target storage device" is a target storage device for which the evaluation (environment score, cost score, performance score, total score) is calculated.

A horizontal bar graph 1921 is a horizontal bar graph indicating a ratio among the environment score weight, the cost score weight, and the performance score weight, which will be described later. In addition, the balance graph 1922 is a graph illustrating the ratio among the environment score weight, the cost score weight, and the performance score weight.

Figure 20:
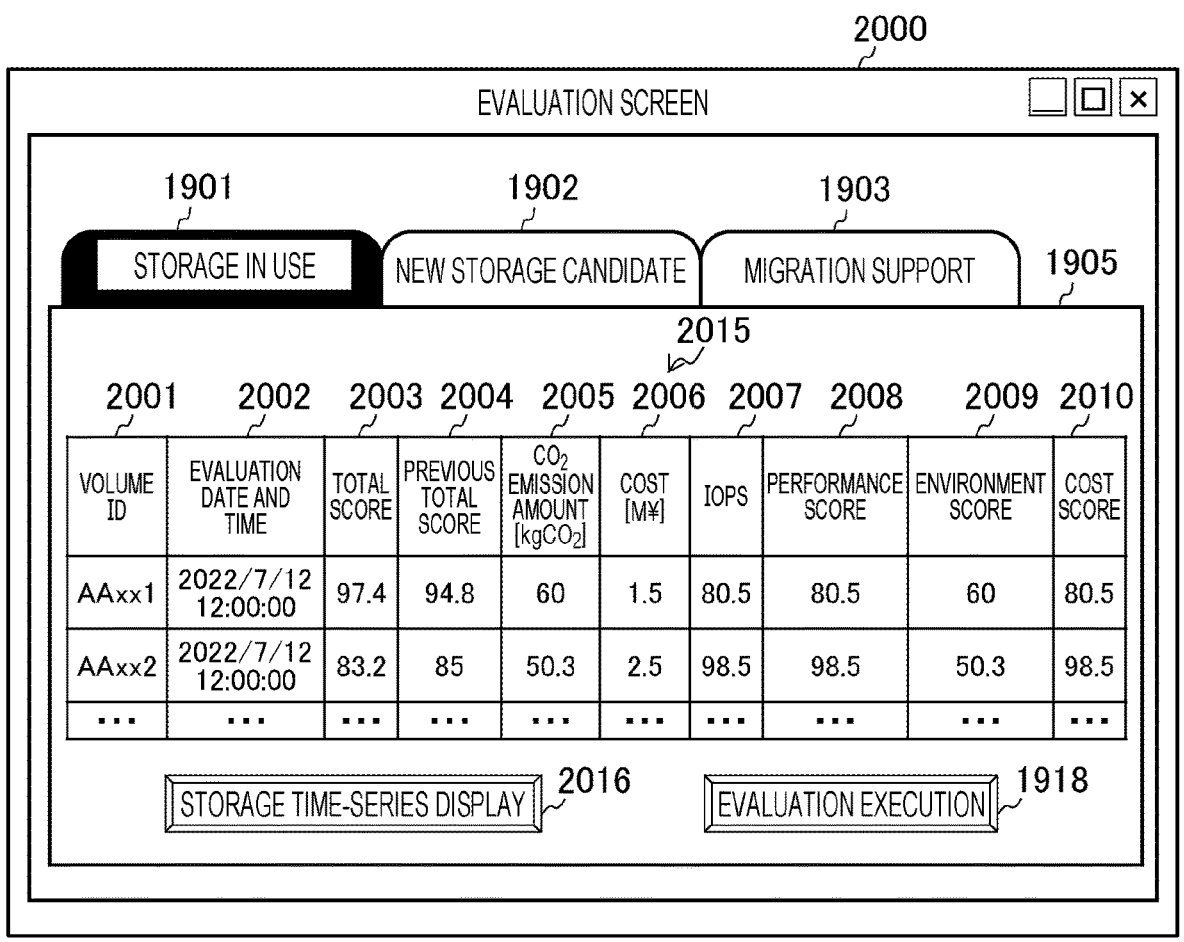
FIG. 20 is an explanatory diagram illustrating an example of an evaluation screen.

FIG. 20 is an explanatory diagram illustrating an example of an evaluation screen 2000 that is displayed on the user terminal 500 or the output device 25 (monitor) of the storage operation support apparatus 1 and displays the storage device evaluation table 236 (see FIG. 8). The evaluation screen 2000 illustrated in FIG. 20 is an example of the evaluation screen 2000 in which the display is switched from the evaluation screen 1900 by pressing the storage device volume switching button 1917 on the evaluation screen 1900 of FIG. 19. As illustrated in FIG. 20, the evaluation screen 2000 includes a storage device evaluation table 2015 that displays a part of the storage device evaluation table 236, a storage device volume switching button 2016, and an evaluation execution button 1918. Here, the configuration of the storage device evaluation table 1711 is similar to the configuration of the storage device evaluation table 236 (see FIG. 8). The storage device volume switching button 2016 on the evaluation screen 2000 is similar to the value switching button 1916 on the evaluation screen 1900 illustrated in FIG. 19. The storage device volume switching button 2016 is a button for inputting an instruction to switch to the display of the evaluation screen 1900 illustrated in FIG. 19. When the storage device volume switching button 2016 is pressed, the display of the evaluation screen is switched from the evaluation screen 2000 illustrated in FIG. 20 to the evaluation screen 1900 illustrated in FIG. 19. The evaluation execution button 1918 is similar to the evaluation execution button 1918 on the evaluation screen 1900 illustrated in FIG. 19.

Figure 21:
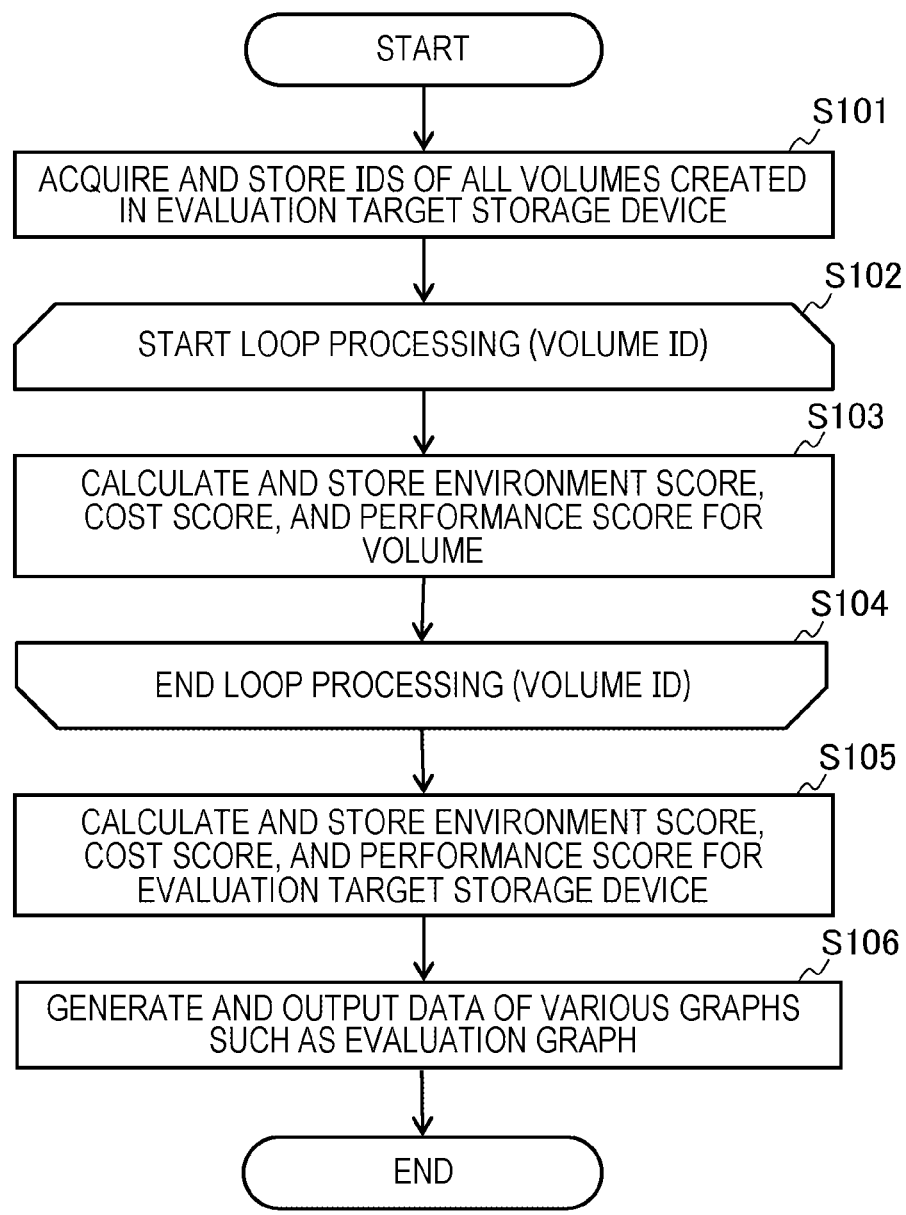
FIG. 21 is a flowchart illustrating an example of evaluation processing according to the embodiment.

<A, Evaluation Processing, FIG. 21>

FIG. 21 is a flowchart illustrating an example of evaluation processing according to the embodiment. The evaluation processing illustrated in an example in FIG. 21 is executed by the evaluation unit 31 (see FIG. 1) of the storage operation support apparatus 1. As described above, when the evaluation execution button 1918 on the evaluation screen 1900 illustrated in FIG. 19 or the evaluation screen 2000 illustrated in FIG. 20 is pressed, the evaluation unit 31 executes the evaluation processing using the ID of the storage device to be evaluated selected using the evaluation target storage device selection button 1911 and the value of the score weight (environment score weight, cost score weight, and performance score weight) input to the score weight setting table 1912 as inputs.

The storage operation support apparatus 1, with reference to the storage device information (on-premises environment storage device operation information table 231 or cloud environment storage device operation information table 232) storing the information of the state of the storage device in use and the volume operation information table 233, acquires and stores the information of the storage device (also referred to as "evaluation target storage device") associated with the evaluation target storage device ID (also referred to as "evaluation target storage device ID") input on the evaluation screen 1900 and the IDs of all the volumes created in the evaluation target storage device (Step S101).

Here, the storage operation support apparatus 1, with reference to the on-premises environment storage device operation information table 231 and the cloud environment storage device operation information table 232, acquires at least one record (set as an evaluation target record) storing the ID (ID of storage device to be evaluated selected using evaluation target storage device selection button 1911) of the input storage device.

When the evaluation target record is stored in the on-premises environment storage device operation information table 231 (that is, in a case where the evaluation target storage device is the storage device in the on-premises environment), the storage operation support apparatus 1, with reference to the on-premises environment storage device operation information table 231 (see FIG. 3), acquires the value of the installation region 303, the value of the product name 304, the value of the power supply source 305, the value of the capacity 310, the value of the compression rate 311, the value of the price 312, and the value of the service life 313 from the latest record associated with the evaluation target storage device ID input on the evaluation screen 1900.

Then, the storage operation support apparatus 1, with reference to the $CO_2$ emission coefficient acquisition location table 234 (see FIG. 6), acquires the location 602 (that is, location of power supply source information server 520 illustrated in FIG. 1) associated with the acquired value of the power supply source 305. The storage operation support apparatus 1 accesses the acquired location 602 and acquires the value of the $CO_2$ emission coefficient [kg-$CO_2$/kWh] using an existing text mining technology or the like.

In addition, the storage operation support apparatus 1 executes the storage device monitoring program 14a to acquire the power consumption of the evaluation target storage device, a value (renewable energy annual power consumption) obtained by converting the power supplied from the renewable energy power generation device 200 of the evaluation target storage device into power per year (unit: [kW/year]), and the value of IOPS of the evaluation target storage device from the evaluation target storage device in the on-premises environment. The storage operation support apparatus 1 converts the acquired power consumption of the evaluation target storage device into annual power consumption [KW/year] (hereinafter, it is referred to as "evaluation target storage device converted annual power consumption") of the evaluation target storage device.

The storage operation support apparatus 1 associates the value of the installation region 303, the value of the product name 304, the value of the power supply source 305, the value of the capacity 310 (hereinafter, referred to as "evaluation target storage capacity"), the value of the compression rate 311, the value of the price 312 (hereinafter, referred to as "evaluation target storage device price"), the value of the service life 313, the value of the $CO_2$ emission coefficient [kg-$CO_2$/KW] (power supply source $CO_2$ emission coefficient 306), the value of the IOPS of the evaluation target storage device (IOPS 309 of the storage device), the annual power consumption (annual power consumption 307) of the evaluation target storage device, the renewable energy annual power consumption (renewable energy annual power consumption 308) of the evaluation target storage device, the evaluation target storage device ID (storage device ID 301), and the current time (extraction date and time 302) acquired as described above to obtain a new record (referred to as an "evaluation target storage device record"), and stores the new record in the main memory device 22 and the on-premises environment storage device operation information table 231.

Meanwhile, when the evaluation target record is stored in the cloud environment storage device operation information table 232 (that is, in case where evaluation target storage device is storage device in cloud environment), the storage operation support apparatus 1, with reference to the cloud environment storage device operation information table 232 (see FIG. 4), acquires the service name 403 from the latest record associated with the evaluation target storage device ID input on the evaluation screen 1900.

Then, the storage operation support apparatus 1 acquires the annual $CO_2$ emission amount per capacity [kg-$CO_2$/TB], the monthly usage fee per capacity [√TB/month], the volume capacity [TB] of the evaluation target storage device ID, and the maximum storage capacity [TB] from the cloud environment of the service name 403. The storage operation support apparatus 1 generates a new record (referred to as "evaluation target storage device record") in which the acquired values and the current time as the extraction date and time 402 are stored in association with each other, and stores the record in the main memory device 22 and the cloud environment storage device operation information table 232 (see FIG. 4). In the above description, the storage operation support apparatus 1 acquires and stores the information of the evaluation target storage device.

The storage operation support apparatus 1, with reference to the volume operation information table 233, acquires the volume IDs 501 (referred to as all "evaluation target volume IDs") of all records of the latest time (extraction date and time 502 is the latest time) associated with the evaluation target storage device ID input on the evaluation screen 1900, and stores the volume IDs in the main memory device 22. Here, the acquired volume ID 501 is the volume IDs of all the volumes created in the evaluation target storage device.

In addition, the storage operation support apparatus 1 executes the storage device monitoring program 14a to acquire IOPS of the volume and the volume capacity for each volume with the acquired volume ID 501 (evaluation target volume ID) from the evaluation target storage device in the on-premises environment or the cloud environment. Then, the storage operation support apparatus 1 generates a new record (referred to as "evaluation target volume record") in which the acquired volume ID 501 (evaluation target volume ID), the IOPS of the acquired volume, the volume capacity, the evaluation target storage device ID, and the current time as the extraction date and time 502 are stored in association with each other, and stores the new record in the main memory device 22 and the volume operation information table 233.

Next, the storage operation support apparatus 1 starts loop processing of calculating the environment score, the cost score, the performance score, and the total score for all the volumes created in the evaluation target storage device (Step S102). The processing illustrated between the loop start step S102 and the loop end step S104 is repeatedly performed for each volume ID (that is, for each evaluation target volume ID,) of the volume created in the evaluation target storage device acquired in Step S101. In Step S102, the storage operation support apparatus 1 selects one evaluation target volume ID from the unprocessed evaluation target volume IDs among the volume IDs (evaluation target volume IDs) of all the volumes created in the evaluation target storage device.

Next, the storage operation support apparatus 1 calculates the environment score, the cost score, the performance score, and the total score for the evaluation target volume ID selected in Step S102, and stores them in the volume evaluation table 235 (see FIG. 7) (Step S103). Here, the storage operation support apparatus 1 calculates the environment score, the cost score, the performance score, and the total score using an expression illustrated in FIG. 22.

FIG. 22 is a diagram illustrating an example of the expression for calculating a score for a volume created in the storage device. First, calculation of the environment score of the volume will be described. The storage operation support apparatus 1 calculates, as the $CO_2$ emission amount of the volume, a value obtained by substituting the value of the volume capacity of the evaluation target volume record, the compression rate of the evaluation target storage device record, the evaluation target storage capacity (storage device capacity), the annual power consumption (annual power consumption of the storage) of the evaluation target storage device, the renewable energy annual power consumption (annual power consumption of the renewable energy) of the evaluation target storage device, and the $CO_2$ emission coefficient into Expression (1A1) of FIG. 22. Then, the storage operation support apparatus 1 calculates a value obtained by substituting the calculated $CO_2$ emission amount of the volume and the environment coefficient (specified value) into Expression (1A2) of FIG. 22 as the environment score of the volume.

Here, the term "volume capacity×compression rate/storage device capacity" in Expression (1A1) represents a ratio of a storage area occupied by the evaluation target volume in the evaluation target storage device. Here, by dividing the "volume capacity" by "the conversion capacity of the evaluation target storage=the evaluation target storage device capacity/the compression rate", the "$CO_2$ emission amount of the volume" and the "environment score" are calculated using the "conversion capacity of the evaluation target storage" (see FIG. 18) instead of the "evaluation target storage capacity". As a result, the environment score can be calculated more accurately.

In the above description, the value obtained by multiplying the $CO_2$ emission amount of the volume by the environment coefficient is set as the environment score, but the environment score of the volume may be any value indicating the load on the environment of the volume, and the method of calculating the environment score can be appropriately changed. For example, as described below, a value indicating the load on the environment due to the disposal of the storage device may be added to the environment score. The storage device usually generates waste generated by disposal or carbon dioxide generated by disposal at the time of disposal. Then, the amount of waste generated by disposal and the amount of carbon dioxide generated by disposal increase as the weight of the storage device increases, and decrease as the weight of the storage device decreases. Therefore, the weight of the storage device is added to the column of the on-premises environment storage device operation information table 231 and the field of the evaluation target storage device record.

Then, a value obtained by multiplying the weight of the storage device by the value of the volume capacity of the evaluation target volume record, the compression rate of the evaluation target storage device record, and the weight constant (set value) and dividing the multiplied value by the evaluation target storage device capacity is set as a disposal load amount (disposal load amount of volume=weight of storage device×volume capacity×compression rate×weight constant/evaluation target storage device capacity) of the volume. Then, a value obtained by multiplying the sum of the disposal load amount of the volume and the $CO_2$ emission amount of the volume by the environment coefficient is set as the environment score of the volume (environment score of volume=(disposal load amount of volume+$CO_2$ emission amount of volume)×environmental coefficient).

Next, calculation of the cost score of the volume will be described. The storage operation support apparatus 1 calculates a value obtained by substituting the value of the volume capacity of the evaluation target volume record, the compression rate of the evaluation target storage device record, the evaluation target storage capacity (storage device capacity), the evaluation target storage device price (storage device price), and the service life (storage service life) of the evaluation target storage device into Expression (1B1) of FIG. 22 as the annual cost of the volume. Then, the storage operation support apparatus 1 calculates a value obtained by substituting the calculated annual cost of the volume and the cost coefficient (specified value) into Expression (1B2) of FIG. 22 as the cost score of the volume.

In the above description, the cost score of the volume is calculated from the annual cost of the volume, but the cost score of the volume may be any value indicating the magnitude of the cost of the volume, and the method of calculating the cost score can be appropriately changed. For example, the cost for disposal of the storage device may be added to the cost score as follows. Generally, in the storage device, as the weight of the storage device is heavier, the cost required for disposal of the storage device increases, and as the weight of the storage device is lighter, the cost required for disposal of the storage device decreases. Therefore, the weight of the storage device is added to the column of the on-premises environment storage device operation information table 231 and the field of the evaluation target storage device record.

Then, a value obtained by multiplying the weight of the storage device by the value of the volume capacity of the evaluation target volume record, the compression rate of the evaluation target storage device record, and the cost constant (set value) and dividing the result by the evaluation target storage device capacity is set as a disposal cost (disposal cost of volume=weight of storage device×volume capacity×compression rate×cost constant/evaluation target storage device capacity) of the volume. Then, a value obtained by multiplying the sum of the disposal cost of the volume and the annual cost of the volume by a cost coefficient is set as the cost score (cost score of volume=(disposal cost of volume+ annual cost of volume)×environment coefficient) of the volume.

Next, calculation of the performance score of the volume will be described. As illustrated in Expression (1C1), IOPS of the volume is regarded as the performance of the volume. Then, the storage operation support apparatus 1 calculates a value obtained by substituting the calculated performance of the volume (IOPS of the volume), the performance coefficient (specified value), and the performance reference value (specified value, value of performance of large volume that can be consumed as ideal) into Expression (1C2) of FIG. 22 as the performance score of the volume. The performance score of the volume is a value corresponding to the IOPS of the volume. The performance score of the volume may represent a slow speed of reading and writing data from the volume. Instead of using IOPS of the volume, the performance score of the volume may be calculated using the response time (ms) of the volume or the throughput (MB/s) of the volume.

In addition, in Expression (1C2), the larger the performance of the volume (IOPS of the volume), the smaller the performance score of the volume. That is, the smaller the performance score of the volume is, the more suitable the value is. This is to make the evaluation on the magnitude of the value of the performance score of the volume similar to the environment score and the cost score of the volume as follows. As the $CO_2$ emission amount of the volume is smaller ($CO_2$ emission amount is more suitable value), the environment score of the volume is a smaller value. In addition, the lower the annual cost of the volume (more suitable value of annual cost), the smaller the cost score of the volume. As described above, the smaller the values of all of the environment score of the volume, the cost score of the volume, and the performance score of the volume are, the more suitable the values are. This makes it easy for the user to determine whether the environment score of the volume, the cost score of the volume, and the performance score of the volume are more preferable values.

Next, calculation of the total score of the volume will be described. The storage operation support apparatus 1 calculates a value obtained by substituting the environment score, the cost score, and the performance score calculated as described above and the value of the score weight (environment score weight, cost score weight, and performance score weight) input to the score weight setting table 1912 into Expression (D) of FIG. 22 as the total score of the volume. The smaller the value of all of the environment score of the volume, the cost score of the volume, and the performance score of the volume become, the more suitable the values become. As a result, the smaller the value of the total score, the more suitable the value. In addition, the environment coefficient of Expression (1A2), the cost coefficient of Expression (1B2), and the performance coefficient of Expression (1C2) described above are coefficients to be adjusted so that the environmental load ($CO_2$ emission amount), the cost, and the performance of the evaluation target storage device can be evaluated in an equivalent manner.

Meanwhile, when the evaluation target storage device is a cloud storage device, the evaluation target storage device is calculated as follows. First, calculation of the environment score of the volume will be described. The storage operation support apparatus 1 calculates a value obtained by substituting the value of the volume capacity of the evaluation target volume record and the annual $CO_2$ emission amount per capacity of the evaluation target storage device record into Expression (2A1) of FIG. 22 as the $CO_2$ emission amount of the volume. Then, the storage operation support apparatus 1 calculates a value obtained by substituting the calculated $CO_2$ emission amount of the volume and the environment coefficient (specified value) into Expression (2A2) of FIG. 22 as the environment score of the volume. In the above description, the value obtained by multiplying the $CO_2$ emission amount of the volume by the environment coefficient is set as the environment score, but the environment score of the volume may be any value indicating the load on the environment of the volume, and the method of calculating the environment score can be appropriately changed.

Next, calculation of the cost score of the volume will be described. The storage operation support apparatus 1 calculates a value obtained by substituting the value of the volume capacity of the evaluation target volume record and the monthly usage fee per capacity of the evaluation target storage device record into Expression (2B1) of FIG. 22 as the annual cost of the volume. Then, the storage operation support apparatus 1 calculates a value obtained by substituting the calculated annual cost of the volume and the cost coefficient (specified value) into Expression (2B2) of FIG. 22 as the cost score of the volume. Note that the cost score of the volume may be any value indicating the magnitude of the cost of the volume, and the method of calculating the cost score can be appropriately changed.

Next, calculation of the performance score of the volume will be described. As illustrated in Expression (2C1), IOPS of the volume is regarded as the performance of the volume. Then, the storage operation support apparatus 1 calculates a value obtained by substituting the calculated performance of the volume (IOPS of the volume), the performance coefficient (specified value), and the performance reference value (specified value, value of performance of large volume that can be consumed as ideal) into Expression (2C2) of FIG. 22 as the performance score of the volume. The performance score of the volume is a value corresponding to the IOPS of the volume. The performance score of the volume may represent a slow speed of reading and writing data from the volume. Instead of using IOPS of the volume, the performance score of the volume may be calculated using the response time (ms) of the volume or the throughput (MB/s) of the volume.

Next, calculation of the total score of the volume will be described. The storage operation support apparatus 1 calculates a value obtained by substituting the environment score, the cost score, and the performance score calculated as described above and the value of the score weight (environment score weight, cost score weight, and performance score weight) input to the score weight setting table 1912 into Expression (D) of FIG. 22 as the total score of the volume. The smaller the values of all of the environment score of the volume, the cost score of the volume, the performance score of the volume, and the total score of the volume, the more suitable the values are.

Further, the storage operation support apparatus 1 stores a new record in which the environment score, the cost score, the performance score, the total score, and the volume ID calculated as described above are associated with each other in the volume evaluation table 235 (see FIG. 7). Here, the storage operation support apparatus 1 acquires the value of the total score of the latest record among the records associated with the volume ID in the volume evaluation table 235, and sets the acquired value of the total score as the value of the previous total score 705 of the new record.

Next, the storage operation support apparatus 1 determines whether the processing has been completed for the volume IDs (that is, evaluation target volume ID) of all the volumes created in the evaluation target storage device acquired in Step S101 (Step S104). When the storage operation support apparatus 1 determines in Step S104 that the processing has not been completed for the volume IDs (evaluation target volume IDs) of all the volumes created in the evaluation target volume storage device acquired in Step S101, the storage operation support apparatus 1 returns to Step S102 and continues the processing. Meanwhile, when the storage operation support apparatus 1 determines that the processing has been completed for the volume IDs (evaluation target volume IDs) of all the volumes created in the evaluation target storage device acquired in Step S101, the storage operation support apparatus 1 executes the processing in Step S105.

Next, the storage operation support apparatus 1 calculates the environment score, the cost score, the performance score, and the total score for the evaluation target storage device, and stores the environment score, the cost score, the performance score, and the total score in the storage device evaluation table 236 (see FIG. 8) (Step S105). Here, the storage operation support apparatus 1 calculates the environment score, the cost score, the performance score, and the total score using an expression illustrated in FIG. 22.

First, calculation of the environment score will be described. The storage operation support apparatus 1 calculates a value obtained by substituting the annual power consumption (annual power consumption of the storage) of the evaluation target storage device of the evaluation target storage device record, the renewable energy annual power consumption (annual power consumption of the renewable energy) of the evaluation target storage device, and the $CO_2$ emission coefficient into Expression (3A1) of FIG. 22 as the $CO_2$ emission amount of the storage device. Then, the storage operation support apparatus 1 calculates a value obtained by substituting the calculated $CO_2$ emission amount of the storage device and the environment coefficient (specified value) into Expression (3A2) of FIG. 22 as the environment score.

In the above description, a value obtained by multiplying the $CO_2$ emission amount of the storage device by the environment coefficient is set as the environment score. The environment score of the storage device may be a value indicating the load on the environment of the volume, and the method of calculating the environment score can be appropriately changed. For example, a value indicating a load on the environment due to disposal of the storage device may be added to the environment score. In the storage device, usually, the amount of waste generated by disposal and the amount of carbon dioxide generated by disposal increase as the weight of the storage device increases. Therefore, the weight of the storage device is added to the column of the on-premises environment storage device operation information table 231 and the field of the evaluation target storage device record.

Then, a value obtained by multiplying the weight of the storage device by a weight constant (set value) is set as a disposal load amount of the storage device (disposal load amount of storage device=weight of the storage device×weight constant). Then, a value obtained by multiplying the sum of the disposal load amount of the storage device and the $CO_2$ emission amount of the storage device by the environment coefficient is set as the environment score (environment score of storage device=(disposal load of storage device+$CO_2$ emission of storage device)×environment coefficient) of the storage device.

Next, calculation of the cost score will be described. The storage operation support apparatus 1 calculates a value obtained by substituting the evaluation target storage device price (storage device price) and the service life (storage service life) of the evaluation target storage device into Expression (3B1) of FIG. 22 as the annual cost of the storage device. Then, the storage operation support apparatus 1 calculates a value obtained by substituting the calculated annual cost of the storage device and the cost coefficient (specified value) into Expression (3B2) of FIG. 22 as the cost score of the storage device.

The cost score of the storage device may be a value indicating the magnitude of the cost of the storage device, and the method of calculating the cost score can be appropriately changed. For example, the cost for disposal of the storage device may be added to the cost score as follows. In the storage device, normally, as the weight of the storage device is heavier, the cost required for disposal of the storage device increases. Therefore, the weight of the storage device is added to the column of the on-premises environment storage device operation information table 231 and the field of the evaluation target storage device record. Then, a value obtained by multiplying the weight of the storage device by a cost constant (set value) is set as a disposal cost of the storage device (disposal cost of storage device=weight of storage device×cost constant). Then, a value obtained by multiplying the sum of the disposal cost of the storage device and the annual cost of the storage device by a cost coefficient is set as a cost score (cost score of storage device=(disposal cost of storage device+annual cost of storage device)×environment coefficient) of the storage device.

Next, calculation of the performance score of the storage device will be described. As illustrated in Expression (3C1), IOPS of the storage device is regarded as the performance of the storage device. Then, the storage operation support apparatus 1 calculates a value obtained by substituting the performance of the storage device (IOPS of the storage device), the performance coefficient (specified value), and the performance reference value (specified value, value of performance of large storage device that can be considered as ideal) into Expression (3C2) of FIG. 22 as the performance score of the storage device. The performance score of the storage device is a value corresponding to the IOPS of the storage device according to the IOPS of the storage device. The performance score of the storage device may represent a slow speed of reading and writing data of the storage device. Instead of using the IOPS of the evaluation target storage device, the performance score of the storage device may be calculated using the response time (ms) of the evaluation target storage device or the throughput (MB/s) of the volume.

Next, calculation of the total score will be described. The storage operation support apparatus 1 calculates a value obtained by substituting the environment score, the cost score, and the performance score calculated as described above and the value of the score weight (environment score weight, cost score weight, and performance score weight) input to the score weight setting table 1912 into Expression (D) of FIG. 22 as the total score of the evaluation target storage device. In addition, the smaller the values of all of the environment score, the cost score, the performance score, and the total score for the evaluation target storage device, the more suitable the values are. As a result, the user can easily determine whether all of the environment score, the cost score, the performance score, and the total score of the evaluation target storage device are more preferable values.

Meanwhile, when the evaluation target storage device is a cloud storage device, the evaluation target storage device is calculated as follows. First, calculation of the environment score will be described. The storage operation support apparatus 1 calculates a value obtained by substituting the value of the volume usage capacity and the annual $CO_2$ emission amount per capacity of the evaluation target storage device record into Expression (4A1) of FIG. 22 as the $CO_2$ emission amount of the storage device. Then, the storage operation support apparatus 1 calculates a value obtained by substituting the calculated $CO_2$ emission amount of the body storage device and the environment coefficient (specified value) into Expression (4A2) of FIG. 22 as the environment score of the storage device. Note that, in the above description, the value obtained by multiplying the $CO_2$ emission amount of the storage device by the environment coefficient is set as the environment score, but the environment score of the storage device may be any value indicating the load on the environment of the volume, and the method of calculating the environment score can be appropriately changed.

Next, calculation of the cost score will be described. The storage operation support apparatus 1 calculates a value obtained by substituting the value of the volume usage capacity and the monthly usage fee per capacity of the evaluation target storage device record into Expression (4B1) of FIG. 22 as the annual cost of the storage device. Then, the storage operation support apparatus 1 calculates a value obtained by substituting the calculated annual cost of the storage device and the cost coefficient (specified value) into Expression (4B2) of FIG. 22 as the cost score of the storage device. Note that the cost score of the storage device only needs to be a value indicating the magnitude of the cost of the storage device, and the method of calculating the cost score can be appropriately changed.

Next, calculation of the performance score will be described. As illustrated in Expression (4C1), IOPS of the storage device is regarded as the performance of the storage device. Then, the storage operation support apparatus 1 calculates a value obtained by substituting the performance of the storage device (IOPS of the storage device), the performance coefficient (specified value), and the performance reference value (specified value, value of performance of large storage device that can be considered as ideal) into Expression (4C2) of FIG. 22 as the performance score of the storage device. The performance score of the storage device may represent a slow speed of reading and writing data of the storage device. Instead of using the IOPS of the storage device, the performance score of the storage device may be calculated using the response time (ms) of the storage device or the throughput (MB/s) of the storage device.

Next, calculation of the total score will be described. The storage operation support apparatus 1 calculates a value obtained by substituting the environment score, the cost score, and the performance score calculated as described above and the value of the score weight (environment score weight, cost score weight, and performance score weight) input to the score weight setting table 1912 into Expression (D) of FIG. 22 as the total score of the volume. The smaller the values of all of the environment score of the volume, the cost score of the volume, the performance score of the volume, and the total score of the volume, the more suitable the values are.

Further, the storage operation support apparatus 1 stores the environment score, the cost score, the performance score, and the total score for the evaluation target storage device calculated as described above, the evaluation target storage device ID, the current time as the evaluation date and time 802, and a new record associated with each other in the main memory device 22 and the storage device evaluation table 236 (see FIG. 8). Here, the storage operation support apparatus 1 acquires the value of the total score of the latest record among the records associated with the evaluation target storage device ID in the storage device evaluation table 236, and sets the acquired value of the total score as the value of the previous total score 805 of the new record.

Next, the storage operation support apparatus 1 generates and outputs data of various graphs (example illustrated in FIG. 19 includes horizontal bar graph 1921 and balance graph 1922) such as the storage device time-series evaluation graph (see storage device time-series evaluation graph 1915 in FIG. 19) including the environment score, the cost score, the performance score, and the total score for the evaluation target storage device calculated in Step S105, and ends the processing (Step S106). Here, the output destination is the user terminal 500 or the output device 25 of the storage operation support apparatus 1. When the data of the storage device time-series evaluation graph is output, the storage device time-series evaluation graph 1915 of the evaluation screen 1900 (FIG. 19) displayed on the user terminal 500 or the output device 25 of the storage operation support apparatus 1 is updated to the storage device time-series evaluation graph of the output data. Similarly, the horizontal bar graph 1921 and the balance graph 1922 of the evaluation screen 1900 in FIG. 19 are also updated on the basis of the output data.

When the storage device volume switching button 1917 (see FIG. 19) of the evaluation screen displayed on the user terminal 500 or the output device 25 of the storage operation support apparatus 1 is pressed, the evaluation screen 2000 of FIG. 20 is displayed, and the new record stored in the storage device evaluation table 236 is displayed.

<Periodic Evaluation of Storage Device by Evaluation Processing>

The storage operation support apparatus 1 automatically executes the evaluation processing with the IDs of all the storage devices in use and the value of the score weight (environment score weight, cost score weight, and performance score weight) most recently input to the score weight setting table 1912 as inputs every predetermined period (for example, every month).

That is, the storage operation support apparatus 1 extracts all the storage device IDs stored in the storage device information (on-premises environment storage device operation information table 231 (see FIG. 3) or cloud environment storage device operation information table 232 (see FIG. 4)) storing the information on the state of the storage device in use every predetermined period (for example, every month). Then, the above evaluation processing is executed with each storage device ID other than "Ref1" among the extracted threshold device IDs and the value of the score weight (environment score weight, cost score weight, and performance score weight) most recently input to the score weight setting table 1912 as inputs.

As a result, the environment score, the cost score, the performance score, and the total score are calculated for all the storage devices in use every predetermined period, and are stored in the storage device evaluation table 326 (see FIG. 8). In addition, the environment score, the cost score, the performance score, and the total score are calculated for the volumes generated in all the storage devices in use every predetermined period, and are stored in a volume device evaluation table 325 (see FIG. 7).

In addition, the storage operation support apparatus 1 generates information of a storage device time-series evaluation graph (see the storage device time-series evaluation graph 1915 in FIG. 19) indicating a time-series change of at least one score (environment score, cost score, performance score, total score) for each storage device in use. As a result, the user can easily evaluate the storage device in use in time series with reference to the storage device time-series evaluation graph.

Figure 24:
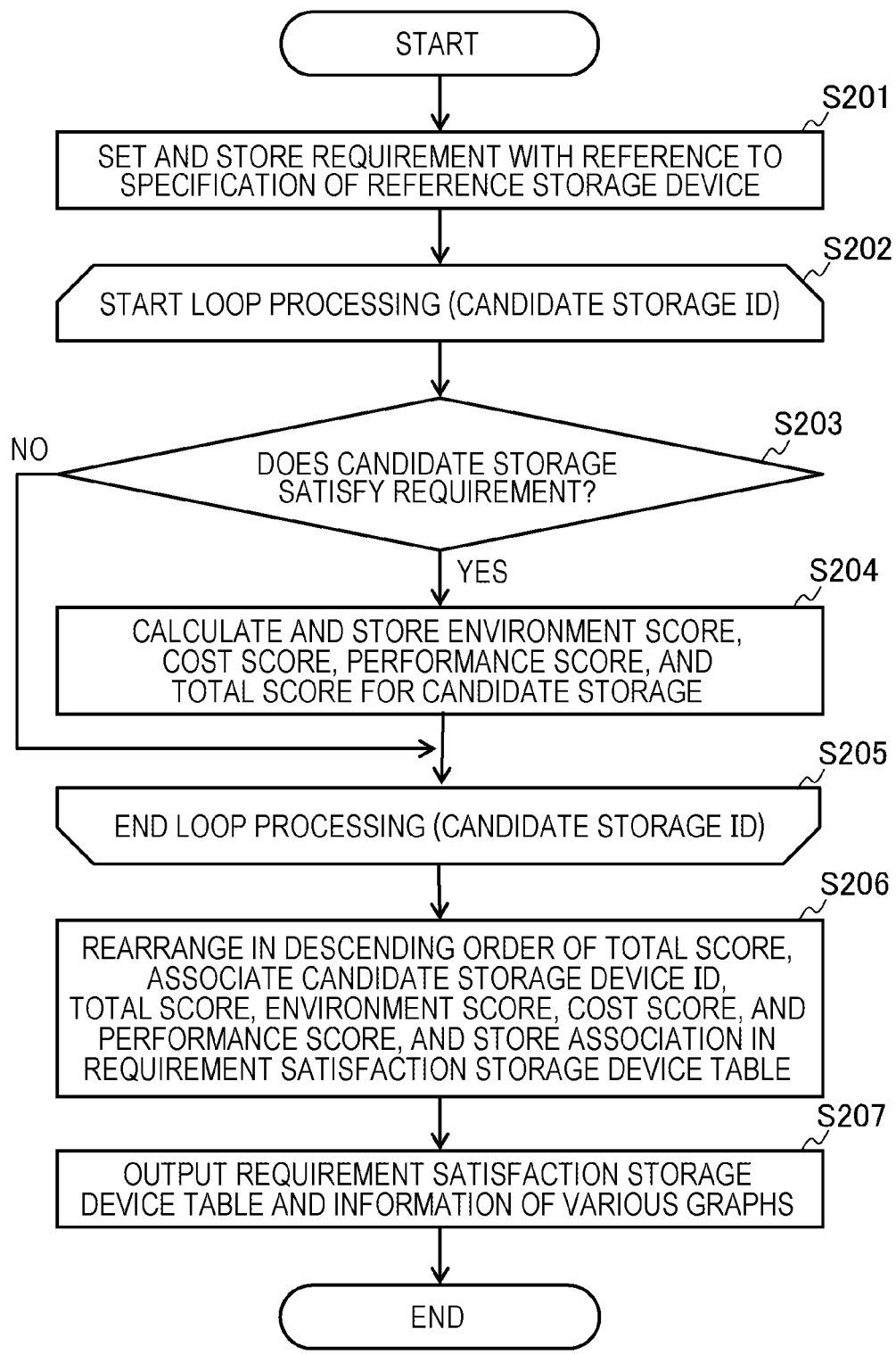
FIG. 24 is a flowchart illustrating an example of storage candidate evaluation processing according to the embodiment.

<B, Storage Candidate Evaluation Processing, FIG. 24>

FIG. 23 illustrates the evaluation screen 2300 when the new storage candidate tab 1902 is selected. The background of the new storage candidate tab 1902 in FIG. 23 has a black background to indicate that it is selected. When a requirement for a new storage device to be newly used is input and an instruction to execute the storage candidate evaluation processing is further input using the evaluation screen 2300 illustrated in FIG. 23 in a case where the new storage candidate tab 1902 is selected, the storage operation support apparatus 1 executes the storage candidate evaluation processing.

As illustrated in FIG. 23, the display area 1905 of the evaluation screen 2300 when the new storage candidate tab 1902 is selected includes a volume type selection check button 2311, a plurality of request item check boxes 2312*a*, a plurality of request value input fields 2312*b*, a score weight graph field 2313, an environment weight input field 2313*a*, a cost weight input field 2313*b*, a performance weight input field 2313*c*, and a candidate calculation start button 2314.

The volume type selection check button 2311 is a button for selecting a type of a volume to be created in a new storage device to be newly used. The request item check box 2312*a* is a field for setting an item of a requirement for a new storage device to be newly used, and when checked by clicking or the like, a check mark is displayed. The request value input field 2312*b* is a field for inputting a value for the item of the requirement drawn on the left of the request value input field 2312*b*.

The score weight graph field 2313 includes the environment weight input field 2313*a* used to input an environment weight, the cost weight input field 2313*b* used to input a cost weight, the performance weight input field 2313*c* used to input a performance weight, and a graph 2313*d* indicating a balance among the input environment weight, cost weight, and performance weight.

In the example of the evaluation screen 2300 illustrated in FIG. 23, the following requirements can be set as the requirements using the request item check box 2312*a* and the request value input field 2312*b*.

Requirement 1: lower limit of capacity; Check of "assumed capacity" and value of "TB or more".

Requirement 2: lower limit of read/write speed; Check of "IOPS" and value of "equal to or more than". The check of ("response time") and the value of "~ ms", the check of ("throughput") and the value of "~ MB/s" are used as requirements when the corresponding values are stored in the on-premises environment storage candidate information table 237 and the cloud environment storage candidate information table 238.

Requirement 3: apparent migration time reduction function; Check of "apparent migration time reduction function", value of "Y/N". When the value of "Y/N" is "Y", the "apparent migration time reduction function" is required as a requirement. When the value of "Y/N" is "N", the "apparent migration time reduction function" may or may not be provided as a requirement.

Requirement 4: redundant data copy number; Check of "reliability", value of "point failure allowed" (number of configurable mirrors of backup related to type such as Raid).

Requirement 5: $CO_2$ emission target value; Check of "comparison with current system", value of "% reduction desired" Note that the check of "$CO_2$ emission amount", the value of "kg/year" and the check of "power consumption", and the value of "within kWh" are used as requirements when the corresponding values are stored in the on-premises environment storage candidate information table 237 and the cloud environment storage candidate information table 238.

When no value is input in the request item check box 2312*a* and the request value input field 2312*b*, and the environment weight input field 2313*a*, the cost weight input field 2313*b*, and the performance weight input field 2313*c* of the score weight graph field 2313, a default requirement is applied as described later.

The candidate calculation start button 2314 is a button for inputting an instruction to execute the storage candidate evaluation processing. When the candidate calculation start button 2314 is pressed, an instruction to execute the storage candidate evaluation processing is input to the storage operation support apparatus 1.

FIG. 24 is a flowchart illustrating an example of the storage candidate evaluation processing according to the embodiment. The storage candidate evaluation processing illustrated in an example in FIG. 24 is executed by the storage candidate evaluation unit 32 (see FIG. 1) of the storage operation support apparatus 1. However, the processing in Step S204 is executed by the evaluation unit 31. As described above, when the candidate calculation start button 2314 on the evaluation screen 2300 illustrated in FIG. 23 is pressed, the storage operation support apparatus 1 acquires the information of the requirement (above-described requirements 1 to 5) set on the evaluation screen 2300 illustrated in FIG. 23, and the storage candidate evaluation unit 32 executes the storage candidate evaluation processing.

The storage operation support apparatus 1 sets a requirement with reference to the specification of the reference storage device, and stores the set requirement (Step S201). Here, the storage operation support apparatus 1 sets the requirement of the on-premises environment and the requirement of the cloud environment using the information (above-described requirements 1 to 5) of the requirement set on the evaluation screen 2300 illustrated in FIG. 23, the record in which the "Ref1" in which the storage device ID represents the ID of the reference storage in the on-premises environment storage device operation information table 231 is stored, and the record in which the "Ref1" in which the storage device ID represents the ID of the reference storage in the cloud environment storage device operation information table 232 is stored.

In the setting of the requirement of the on-premises environment, the storage operation support apparatus 1 acquires the record (referred to as on-premises environment reference record) in which the "Ref1" in which the storage device ID represents the reference storage ID in the on-premises environment storage device operation information table 231 (see FIG. 3) is stored. Then, the storage operation support apparatus 1 stores the record in which the value of the on-premises environment reference record is replaced with the value of the set requirement in the information of the requirement (above-described requirements 1 to 5) set on the evaluation screen 2300 illustrated in FIG. 23 in the main memory device 22 as the requirement information of the on-premises environment.

Meanwhile, in the setting of the requirement of the cloud environment, the storage operation support apparatus 1 acquires the record (referred to as cloud environment reference record) in which the "Ref1" in which the storage device ID represents the reference storage ID in the cloud environment storage device operation information table 232 (see FIG. 4) is stored. Then, the storage operation support apparatus 1 stores the record in which the value of the cloud environment reference record is replaced with the value of the set requirement in the information of the requirement (above-described requirements 1 to 5) set on the evaluation screen 2300 illustrated in FIG. 23 in the main memory device 22 as the requirement information of the cloud environment.

Next, when the candidate storage satisfies the requirement with respect to the candidate storage device IDs of all records stored in the on-premises environment storage candidate information table 237 (see FIG. 9) and the cloud environment storage candidate information table 238 (see FIG. 10), the storage operation support apparatus 1 starts loop processing of calculating the environment score, the cost score, the performance score, and the total score of the candidate storage (Step S202). The processing illustrated between the loop start step S202 and the loop end step S205 is repeatedly performed for each candidate storage ID of the record stored in the on-premises environment storage candidate information table 237 and the cloud environment storage candidate information table 238. In Step S202, the storage operation support apparatus 1 selects one candidate storage ID from among unprocessed candidate storage IDs among the candidate storage IDs of the records stored in the on-premises environment storage candidate information table 237 and the cloud environment storage candidate information table 238.

Next, the storage operation support apparatus 1 determines whether or not the candidate storage associated with the candidate storage ID satisfies the requirement (Step S203). When the storage operation support apparatus 1 determines that the candidate storage associated with the candidate storage device ID satisfies the requirement (Step S202: Yes), the process proceeds to Step S204. Meanwhile, when the storage operation support apparatus 1 determines that the candidate storage associated with the candidate storage ID does not satisfy the requirement (Step S202: No), the process proceeds to Step S205. Here, the storage operation support apparatus 1 determines whether the candidate storage associated with the candidate storage ID satisfies the requirement as follows.

When the candidate storage associated with the candidate storage device ID is the storage device of the on-premises environment (when candidate storage device ID is candidate storage device ID of record (hereinafter, referred to as "candidate record") stored in on-premises environment storage candidate information table 237), the storage operation support apparatus 1 acquires the candidate record from the on-premises environment storage candidate information table 237. In a case where the value of the candidate record satisfies all the requirements of the requirement information of the on-premises environment, the storage operation support apparatus 1 determines that the candidate storage associated with the candidate storage ID satisfies the requirement. Meanwhile, when the value of the candidate record does not satisfy at least one requirement of the requirement information of the on-premises environment, the storage operation support apparatus 1 determines that the candidate storage associated with the candidate storage ID does not satisfy the requirement.

When the candidate storage associated with the candidate storage device ID is the storage device in the cloud environment (when candidate storage device ID is candidate storage device ID of record (hereinafter, referred to as "candidate record") stored in cloud environment storage candidate information table 238), the storage operation support apparatus 1 acquires the candidate record from the cloud environment storage candidate information table 238. When the value of the candidate record satisfies all the requirements of the requirement information of the cloud environment, the storage operation support apparatus 1 determines that the candidate storage associated with the candidate storage ID satisfies the requirement. Meanwhile, when the value of the candidate record does not satisfy at least one requirement of the requirement information of the cloud environment, the storage operation support apparatus 1 determines that the candidate storage associated with the candidate storage ID does not satisfy the requirement.

Here, when the requirement (requirement information) information set in Step S201 includes a storage capacity lower limit value (value of requirement 1 described above with reference to FIG. 23) of the candidate storage device (new storage device to be newly used), the storage operation support apparatus 1, with reference to the candidate record (unused storage device specification information) of the on-premises environment storage candidate information table 237, calculates a value obtained by dividing a storage device actual capacity (storage capacity) of the candidate storage device (unused storage device) in the on-premises environment by the compression rate as the storage device conversion capacity (converted storage capacity) (see FIG. 17). Then, when it is determined whether or not the calculated storage device conversion capacity (converted storage capacity) is larger than the storage capacity lower limit value (value of requirement 1 described above using FIG. 23) and it is determined that the storage device conversion capacity (converted storage capacity) is not larger than the storage capacity lower limit value (value of requirement 1 described above using FIG. 23), it is determined that the candidate storage device (unused storage device) in the on-premises environment does not satisfy the requirement included in the requirement (requirement information), and the candidate storage device (unused storage device) associated with the candidate storage ID does not satisfy the requirement.

Next, the storage operation support apparatus 1 calculates the environment score, the cost score, the performance score, and the total score for the candidate storage associated with the candidate storage ID (candidate storage device specific information), and stores the requirement satisfaction storage device information in which the candidate storage ID, the calculated environment score, the cost score, the performance score, and the total score are associated with each other in the main memory device 22 (Step S204).

Here, in a case where the candidate storage associated with the candidate storage device ID is the storage device in the on-premises environment, the environment score, the cost score, the performance score, and the total score for the candidate storage are calculated by applying the value of the candidate record to Expressions (5A1) to (5C2) of FIG. 25 and Expression (D) of FIG. 22, similarly to Step S105 of the evaluation processing described above.

First, calculation of the environment score will be described. The storage operation support apparatus 1 calculates a value obtained by substituting the storage device annual power consumption (annual power consumption of the storage) of the candidate record and the $CO_2$ emission coefficient into Expression (5A1) of FIG. 25 as the $CO_2$ emission amount of the candidate storage device. Then, the storage operation support apparatus 1 calculates a value obtained by substituting the calculated $CO_2$ emission amount of the candidate storage device and the environment coefficient (specified value) into Expression (5A2) of FIG. 25 as the environment score.

In the above description, a value obtained by multiplying the $CO_2$ emission amount of the storage device by the environment coefficient is set as the environment score. The environment score of the candidate storage device may be a value indicating the load on the environment of the volume, and the method of calculating the environment score can be appropriately changed. For example, a value indicating the load on the environment due to the disposal of the candidate storage device may be added to the environment score. A value obtained by multiplying the weight of the candidate storage device by a weight constant (set value) is set as a disposal load amount of the candidate storage device (disposal load amount of candidate storage device=weight of candidate storage device×weight constant). Then, a value obtained by multiplying the sum of the disposal load amount of the candidate storage device and the $CO_2$ emission amount of the candidate storage device by the environment coefficient is set as the environment score (environment score of candidate storage device=(disposal load amount of candidate storage device+$CO_2$ emission amount of storage device)×environment coefficient) of the candidate storage device.

Next, calculation of the cost score will be described. The storage operation support apparatus 1 calculates a value obtained by substituting the price (storage device price) and the service life (storage service life) of the candidate record into Expression (5B1) of FIG. 25 as the annual cost of the candidate storage device. Then, the storage operation support apparatus 1 calculates a value obtained by substituting the calculated annual cost of the candidate storage device and the cost coefficient (specified value) into Expression (5B2) of FIG. 25 as the cost score of the candidate storage device.

The cost score of the storage device may be a value indicating the magnitude of the cost of the storage device, and the method of calculating the cost score can be appropriately changed. For example, the cost for disposal of the storage device may be estimated and included in the expression for calculating the cost score.

Next, calculation of the performance score of the storage device will be described. As illustrated in Expression (5C1), the value of IOPS of the candidate record is regarded as the performance of the candidate storage device. Then, the storage operation support apparatus 1 calculates a value obtained by substituting the performance of the storage device (IOPS of the candidate storage device), the performance coefficient (specified value), and the performance reference value (specified value, value of performance of large storage device that can be considered as ideal) into Expression (5C2) of FIG. 25 as the performance score of the storage device. The performance score of the storage device is a value corresponding to IOPS of the storage device. The performance score of the storage device may represent a slow speed of reading and writing data of the storage device. Instead of using IOPS of the volume, the performance score of the storage device may be calculated using the response time (ms) of the storage device or the throughput (MB/s) of the volume.

Next, calculation of the total score of the volume will be described. The storage operation support apparatus 1 calculates a value obtained by substituting the environment score, the cost score, and the performance score calculated as described above and the value of the score weight (environment score weight, cost score weight, and performance score weight) input to the score weight graph field 2313 into Expression (D) of FIG. 22 as the total score of the volume. In addition, the smaller the values of all of the environment score, the cost score, the performance score, and the total score for the candidate storage device, the more suitable the values become. As a result, the user can easily determine whether or not the environment score, the cost score, the performance score, and the total score of the candidate storage device are more preferable values.

Meanwhile, when the candidate storage device is a cloud storage device, calculation is performed as follows. First, calculation of the environment score will be described. The storage operation support apparatus 1 calculates a value obtained by substituting the volume usage capacity (volume capacity) of the cloud environment reference record and the annual $CO_2$ emission amount per capacity of the candidate record into Expression (6A1) of FIG. 25 as the $CO_2$ emission amount of the storage device. Then, the storage operation support apparatus 1 calculates a value obtained by substituting the calculated $CO_2$ emission amount of the candidate storage device and the environment coefficient (specified value) into Expression (5A2) of FIG. 25 as the environment score of the candidate storage device. In the above description, the value obtained by multiplying the $CO_2$ emission amount of the candidate storage device by the environment coefficient is set as the environment score, but the environment score of the candidate storage device may be any value indicating the load on the environment of the volume, and the method of calculating the environment score can be appropriately changed.

Next, calculation of the cost score will be described. The storage operation support apparatus 1 calculates a value obtained by substituting the volume usage capacity (volume capacity) of the cloud environment reference record and the monthly usage fee per capacity of the candidate record into Expression (6B1) of FIG. 25 as the annual cost of the candidate storage device. Then, the storage operation support apparatus 1 calculates a value obtained by substituting the calculated annual cost of the candidate storage device and the cost coefficient (specified value) into Expression (6B2) of FIG. 25 as the cost score of the candidate storage device. Note that the cost score of the storage device only needs to be a value indicating the magnitude of the cost of the storage device, and the method of calculating the cost score can be appropriately changed.

Next, calculation of the performance score will be described. As illustrated in Expression (6C1), IOPS (IOPS of volume) of the candidate record is regarded as the performance of the storage device. Then, the storage operation support apparatus 1 calculates a value obtained by substituting the calculated performance (IOPS) of the candidate storage device, the performance coefficient (specified value), and the performance reference value (specified value, value of performance of large storage device that can be considered as ideal) into Expression (6C2) of FIG. 25 as the performance score of the candidate storage device. The performance score of the candidate storage device may represent a slow speed of reading and writing data of the candidate storage device. Instead of using the IOPS of the storage device, the performance score of the storage device may be calculated using the response time (ms) of the storage device or the throughput (MB/s) of the storage device.

Next, calculation of the total score will be described. The storage operation support apparatus 1 calculates a value obtained by substituting the environment score, the cost score, and the performance score calculated as described above and the value of the score weight (environment score weight, cost score weight, and performance score weight) input to the score weight graph field 2313 into Expression (D) of FIG. 22 as the total score of the candidate storage device. The smaller the values of all of the environment score, the cost score, the performance score, and the total score of the candidate storage device are, the more suitable the values are.

Further, the storage operation support apparatus 1 stores a new record associated with the environment score, the cost score, the performance score, and the total score for the candidate storage device (regardless of whether the candidate storage device is in an on-premises environment or a cloud environment), the candidate storage device ID, and the current time as the evaluation date and time 802, which are calculated as described above, in the main memory device 22 as the requirement satisfaction storage device information.

Next, the storage operation support apparatus 1 determines whether or not the processing has been completed for the candidate storage IDs of all the records stored in the on-premises environment storage candidate information table 237 and the cloud environment storage candidate information table 238 (Step S205). When the storage operation support apparatus 1 determines that the processing has not been completed for the candidate storage IDs of all the records stored in the on-premises environment storage candidate information table 237 and the cloud environment storage candidate information table 238, the storage operation support apparatus 1 returns to Step S202 and continues the processing. Meanwhile, when the storage operation support apparatus 1 determines that the process has been completed for the candidate storage IDs of all the records stored in the on-premises environment storage candidate information table 237 and the cloud environment storage candidate information table 238, the storage operation support apparatus 1 executes the processing of Step S206.

Next, in the requirement satisfaction storage device information stored in the main memory device 22, the storage operation support apparatus 1 rearranges the records in descending order of the total score, and stores the rearranged records (information in which candidate storage device ID, total score, environment score, cost score, performance score, and the like are associated with each other) in the requirement satisfaction storage device table 240 (see FIG. 12) (Step S206).

Next, the storage operation support apparatus 1 outputs the requirement satisfaction storage device information (the requirement satisfaction storage device table) stored in the main memory device 22 and data of various graphs, and ends the processing (Step S207). Here, the storage operation support apparatus 1 generates data of various graphs on the basis of the requirement satisfaction storage device table, and outputs information on configurations of the generated various graphs. In addition, the output destination is the user terminal 500 or the output device 25 of the storage operation support apparatus 1. When the requirement satisfaction storage device information (requirement satisfaction storage device table) is output, the requirement satisfaction storage device information (requirement satisfaction storage device table) is displayed on the evaluation screen displayed on the user terminal 500 or the output device 25 of the storage operation support apparatus 1.

Note that the information generated by the storage operation support apparatus 1 in Step S207 includes "data of a score comparison graph indicating the magnitude of at least one score of the environment score, the cost score, the performance score, and the total score for each candidate storage device".

Figure 26:
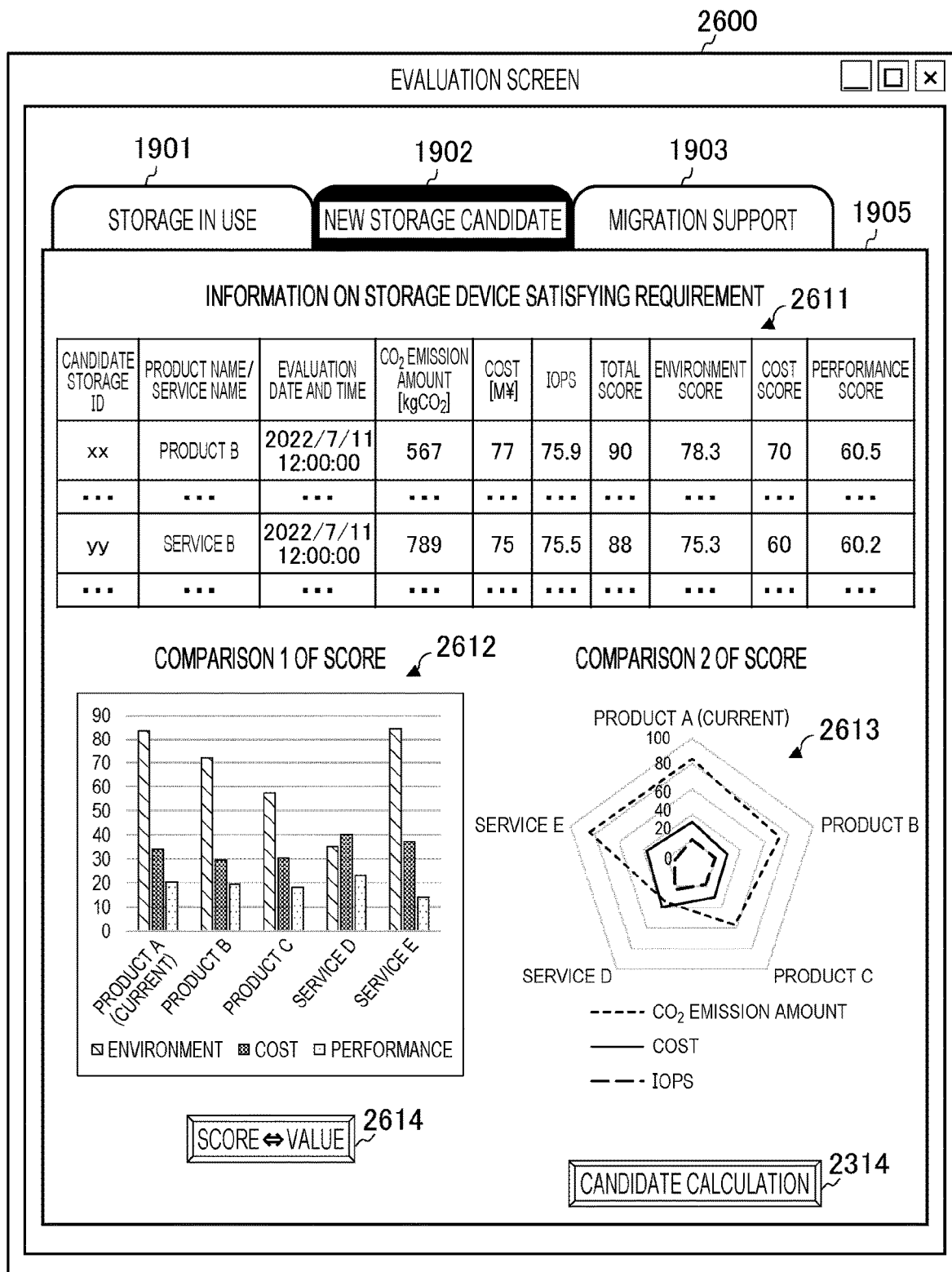
FIG. 26 is an explanatory diagram illustrating an example of an evaluation screen.

FIG. 26 is an example of an evaluation screen 2600 that displays the requirement satisfaction storage device information (requirement satisfaction storage device table). As illustrated in FIG. 26, the display area 1905 of the evaluation screen 2600 displays a requirement satisfaction storage device table 2611, a bar graph 2612 in which a vertical axis represents a score value (environment score, cost score, and performance score) and a horizontal axis represents a product name or a service name of a candidate storage device, a chart 2613 for evaluating each storage device, and a score value switching button 2614.

The data of the graphs of the bar graph (score comparison graph) 2612 and the chart (score comparison graph) 2613 is "data of a score comparison graph indicating the magnitude of at least one score of the environment score, the cost score, the performance score, and the total score for each candidate storage device" generated by the storage operation support apparatus 1 in Step S207 of the storage candidate evaluation processing of FIG. 24.

In this way, in Step S207, the storage operation support apparatus 1 generates the "information of a score comparison graph indicating the magnitude of at least one score of the environment score, the cost score, the performance score, and the total score for each candidate storage device", so that the bar graph (score comparison graph) 2612 and the chart (score comparison graph) 2613 can be easily presented to the user. Then, the user can easily compare the environment score, the cost score, and the performance score among the candidate storage devices of the storage device to be newly used by referring to the bar graph 2612 and the chart 2613. As a result, it is easy to select an appropriate storage device in which the load on the environment, the cost, and the performance are balanced. Therefore, the storage operation support apparatus 1 facilitates selection of an appropriate storage device in which the load on the environment, the cost, and the performance are balanced.

Furthermore, in the example illustrated in FIG. 26, the bar graph 2612 and the chart 2613 illustrate an example indicating the magnitude of the score, but when the score value switching button 2614 is pressed, an amount ($CO_2$ emission amount, cost, IOPS of storage device) is indicated instead of the score (not illustrated). Further, when the score value switching button 2614 is pressed, the display returns to the display indicating the score instead of the amount.

Figure 28:
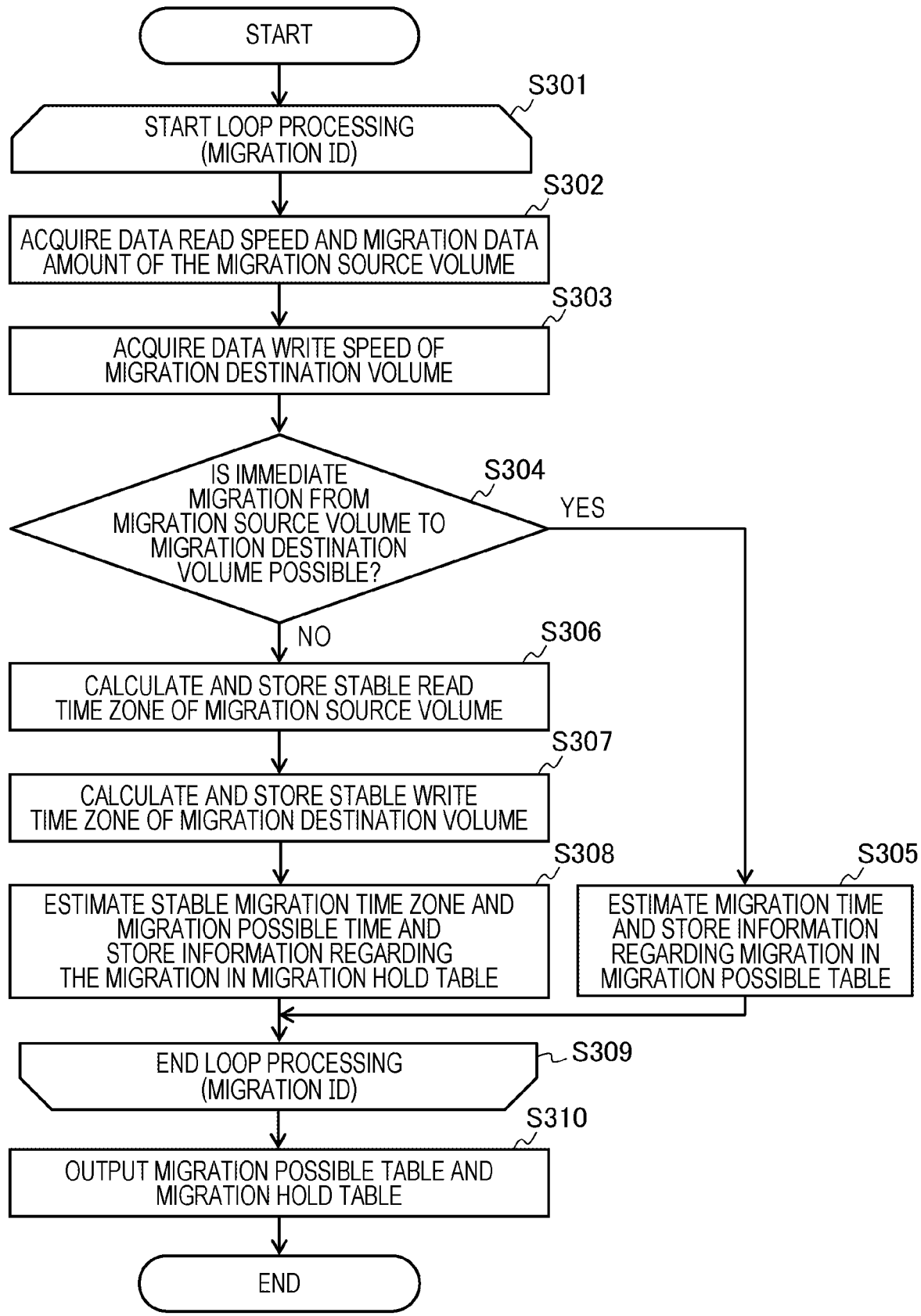
FIG. 28 is a flowchart illustrating an example of migration support processing according to the embodiment.

<C, Migration Support Processing, FIG. 28>

Figure 27:
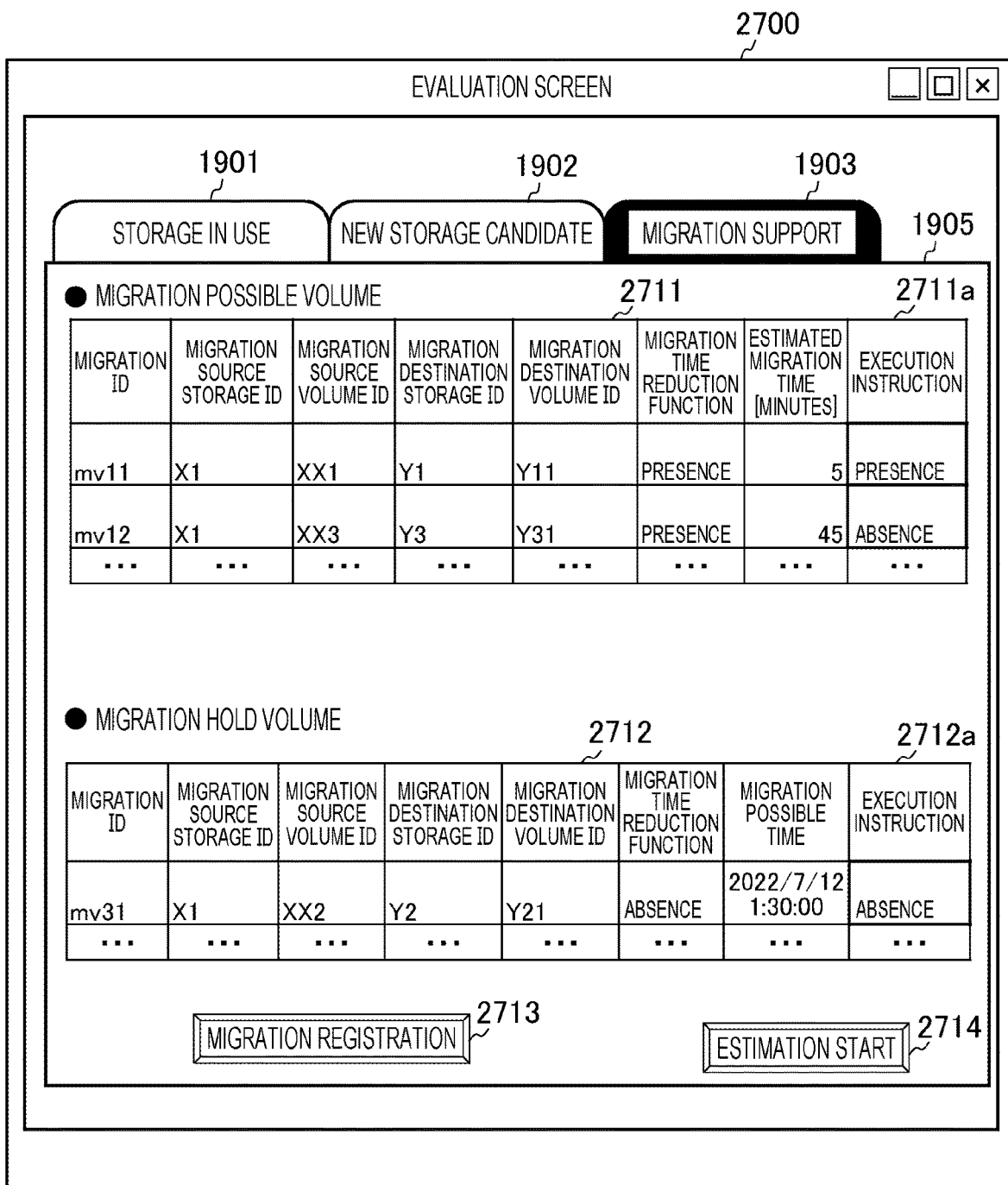
FIG. 27 is an explanatory diagram illustrating an example of an evaluation screen.

FIG. 27 illustrates the evaluation screen 2700 when the migration support tab 1903 is selected. The migration support tab 1903 of FIG. 27 has a black background to indicate it is selected.

As illustrated in FIG. 27, the display area 1905 of the evaluation screen 2700 when the migration support tab 2702 is selected includes a migration possible table 2711, a migration hold table 2712, a migration registration button 2713, and an estimate start button 2714.

The migration possible table 2711 and the migration hold table 2712 store information related to a volume before migration to be migrated (referred to as "pre-migration volume") and a volume of a migration destination (referred to as "migration destination volume"). The migration possible table 2711 is a table indicating information on a volume determined to be immediately migratable after the storage operation support apparatus 1 performs the migration support processing.

The migration possible table 2711 and the migration hold table 2712 are tables created by the storage operation support apparatus 1 by reading the migration possible table 241 (see FIG. 13) and the migration hold table 242 (see FIG. 14).

The column 2711a of the execution instruction of the migration possible table 2711 is switched between "present" and "absent" every time it is pressed. Data is set to be migrated from the volume of the "volume ID" created in the storage device of the "storage ID" of the "migration source storage ID volume ID" in the row in which "present" is input to the volume of the "volume ID" created in the storage device of the "storage ID" of the "migration destination storage ID volume ID". Meanwhile, in a case where "absent" is input, it is set not to be migrated until the instruction of the migration is input (input of "present"). When the value of the column 2711a of the execution instruction is changed, the cell of the migration possible table 241 (see FIG. 13) corresponding to the changed cell is overwritten with the changed value.

The migration hold table 2712 is a table indicating information on the migration source volume and the migration destination volume of the migration determined not to be immediately migratable after the storage operation support apparatus 1 performs the migration support processing. The column 2712a of the execution instruction of the migration hold table 2712 is switched between "present" and "absent" every time it is pressed. Data is set to be migrated from the volume of the "volume ID" created in the storage device of the "storage ID" of the "migration source storage ID volume ID" in the row in which "present" is input to the volume of the "volume ID" created in the storage device of the "storage ID" of the "migration destination storage ID volume ID". Meanwhile, in a case where "absent" is input, it is set not to be migrated until the instruction of the migration is input (input of "present"). When the value in the column 2712a of the execution instruction is changed, the cell of the migration hold table 242 (see FIG. 14) corresponding to the changed cell is overwritten with the changed value.

The migration registration button 2713 is a button used to register a set of the migration source volume and the migration destination volume with respect to the migration hold table 2712 and the migration hold table 242 (see FIG. 14). When the migration registration button 2713 is pressed, an additional row is newly displayed in the migration hold table 2712. When the cell of the migration source storage ID, the migration source volume ID, the migration destination storage ID, and the migration destination volume ID in the additional row is pressed, a list of IDs of the storage devices or a list of IDs of the volumes is displayed, and each ID can be selected. The selected ID is newly input as a cell value of an additional row. When all the cells with these IDs are input, it is automatically determined whether or not the migration time reduction function can be used, and based on the determination result, the presence or absence of the migration time reduction function is displayed in the cell of the migration time reduction function, and the migration ID is automatically assigned and displayed in the cell of the migration ID. In this way, when the information of the cell is confirmed, the information of the record (newly added row) of the migration hold table 2712 including the information of the value of the confirmed cell is stored in the migration hold table 2712 as a new record.

The estimate start button 2714 is a button for inputting an instruction to execute the migration support processing. When the estimate start button 2714 is pressed, the instruction to execute the migration support processing is input to the storage operation support apparatus 1.

FIG. 28 is a flowchart illustrating an example of the migration support processing according to the embodiment. The migration support processing illustrated in an example in FIG. 28 is executed by the migration support unit 33 (see FIG. 1) of the storage operation support apparatus 1. As described above, when the estimate start button 2714 on the evaluation screen 2700 illustrated in FIG. 27 is pressed, the migration support unit 33 executes the migration support processing.

The storage operation support apparatus 1 starts the loop processing of calculating information regarding migration for the migration IDs of all records stored in the migration possible table 241 (see FIG. 13) and the migration hold table 242 (FIG. 14) (Step S301). The processing illustrated between the loop start Step S301 and the loop end Step S309 is repeatedly performed for each migration ID of the record stored in the migration possible table 241 and the migration hold table 242. In Step S301, the storage operation support apparatus 1 selects one migration ID from among the unprocessed migration IDs among the migration IDs of the records stored in the migration possible table 241 and the migration hold table 242.

Next, the storage operation support apparatus 1 acquires the record (referred to as migration information record) in which the migration ID is stored from the migration possible table 241 or the migration hold table 242 and stores the record in the main memory device 22, and acquires the data reading speed and the migration data amount of the migration source volume associated with the migration source volume ID stored in the migration information record (Step S302). The migration data amount is an amount of data (referred to as "migration data") to be copied from the migration source volume to the migration destination volume. The migration data amount is, for example, the capacity of the migration volume. The storage operation support apparatus 1 extracts the migration source storage device ID and the migration source volume ID from the migration information record. Then, the storage operation support apparatus 1 executes the storage device monitoring program 14a to acquire the data reading speed and the migration data amount of the migration source volume associated with the extracted migration source storage device ID and the migration source volume ID.

Next, the storage operation support apparatus 1 acquires the data writing speed of the migration destination volume associated with the migration destination volume ID stored in the migration information record (Step S303). The storage operation support apparatus 1 extracts the migration destination storage device ID and the migration destination volume ID from the migration information record. Then, the storage operation support apparatus 1 executes the storage device monitoring program 14a to acquire the extracted migration destination storage device ID and the data writing speed of the migration destination volume associated with the migration destination volume ID.

Next, the storage operation support apparatus 1 determines whether or not immediate migration from the migration source volume to the migration destination volume is possible based on the data reading speed of the migration source volume acquired in Step S302 and the data writing speed of the migration destination volume acquired in Step S303 (Step S304). When the storage operation support apparatus 1 determines that the immediate migration is possible from the migration source volume to the migration destination volume (Step S304: Yes), the process proceeds to Step S305. Meanwhile, when the storage operation support apparatus 1 determines that the immediate migration from the migration source volume to the migration destination volume is not possible (Step S304: No), the process proceeds to Step S306.

Here, in a case where both the data reading speed and the data writing speed are sufficiently high, it can be considered that the immediate migration from the migration source volume to the migration destination volume is possible. In addition, when the value of the apparent migration time reduction function of the migration information record is "present" and the apparent migration time reduction function can be used for migration, it can be considered that data can be stably migrated from the migration source volume to the migration destination volume. Therefore, when any one of the following two determination conditions is satisfied, the storage operation support apparatus 1 determines that the immediate migration from the migration source volume to the migration destination volume is possible (Step S304: Yes).

Determination condition 1, the data reading speed, and the data writing speed are both sufficiently high.

Determination condition 2 and apparent migration time reduction function can be used.

Meanwhile, when neither of the two determination conditions is satisfied, the storage operation support apparatus 1 determines that the immediate migration from the migration source volume to the migration destination volume is not possible (Step S304: No).

Regarding the determination condition 1 (both the data reading speed and the data writing speed are sufficiently high), the storage operation support apparatus 1 determines that the determination condition 1 is satisfied when the data reading speed is faster than the minimum speed (data reading speed>minimum speed) and the data writing speed is faster than the minimum speed (data writing speed>minimum speed). Here, the minimum speed is a predetermined value set in advance. Meanwhile, the storage operation support apparatus 1 determines that the determination condition 1 is not satisfied when the data reading speed is equal to or lower than the minimum speed (data reading speed≤minimum speed) or the data writing speed is equal to or lower than the minimum speed (data writing speed≤minimum speed).

Regarding the determination condition 2 (the apparent migration time reduction function can be used), the storage operation support apparatus 1 determines that the determination condition 2 is satisfied when the value of the apparent migration time reduction function of the migration information record is "present". Meanwhile, when the value of the apparent migration time reduction function of the migration information record is "absent", the storage operation support apparatus 1 determines that the determination condition 2 is not satisfied.

Next, the storage operation support apparatus 1 calculates the migration time and stores information regarding the migration in the migration possible table 241 (Step S305). Here, when the value of the apparent migration time reduction function of the migration information record is "present", the storage operation support apparatus 1 sets the migration time to a predetermined migration reduction time (for example, 1 minute). When the value of the apparent migration time reduction function of the migration information record is "absent", the storage operation support apparatus 1 calculates a value obtained by dividing the migration data amount acquired in Step S302 by a slower speed (referred to as transfer speed) of the data reading speed and the data writing speed as the migration time (migration time=migration data amount/transfer speed).

Therefore, in the migration support processing (the migration support unit 33), when the information on the presence or absence of the apparent migration time reduction function from the migration source volume to the migration destination volume, which is the value of the migration time reduction function 1306 of the migration information record of the migration possible table 241 or the value of the migration time reduction function 1406 of the migration information record of the migration hold table 242, indicates that the apparent migration time reduction function is "present", the storage operation support apparatus 1 sets the data migration time as the predetermined migration reduction time. As a result, the storage operation support apparatus 1 can calculate the migration time more suitably, and the user can easily appropriately migrate the volume.

Further, the storage operation support apparatus 1 replaces the values of the migration time and the transfer speed with the values of the migration time calculated above for the migration record. Then, when the migration record is stored in the migration possible table 241, the storage operation support apparatus 1 replaces the migration record of the migration possible table 241 with the replaced migration record. In addition, when the migration record is stored in the migration hold table 242, the storage operation support apparatus 1 deletes the migration possible record from the migration hold table 242 and stores the migration record in which the value of the migration time is replaced in the migration possible table 241. As a result, the storage operation support apparatus 1 updates the information included in the record of the migration possible table 241 or the record of the migration possible table 241 corresponding to the migration record.

Next, the storage operation support apparatus 1 calculates a stable read time zone of the migration source volume, and stores information of the calculated stable read time zone in the main memory device 22 (Step S306). Here, the storage operation support apparatus 1 calculates a stable read time zone Tpr of the migration source volume as follows. The stable read time zone Tpr is a time zone in which it can be estimated that data can be stably read from the migration source volume.

Figure 29:
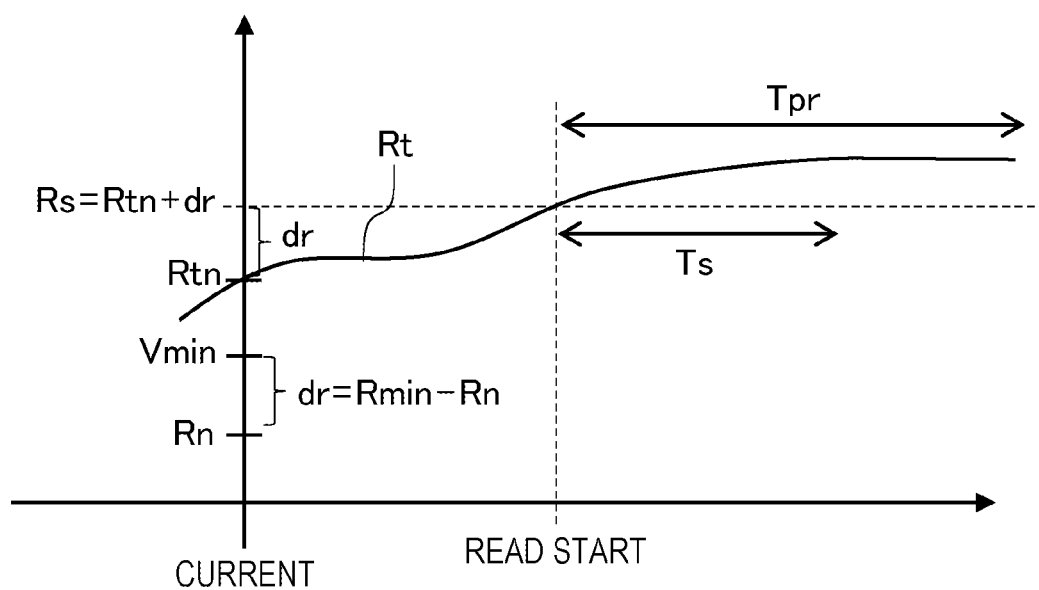
FIG. 29 is an explanatory diagram for explaining a method of calculating a stable read time zone.

FIG. 29 is an explanatory diagram for explaining a method of calculating the stable read time zone Tpr.

First, at the current time, a calculation method in a case where "the minimum speed Vmin>the read speed Rn of the migration source volume at the current time (case: the minimum speed Vmin>the read speed Rn) will be described. Assume that the insufficient read speed dr=the minimum speed Vmin−the read speed Rn of the migration source volume at the current time. The storage operation support apparatus 1 calculates the insufficient read speed dr.

The storage operation support apparatus 1 complements the data of the migration source storage read speed table 243 storing the information on the temporal change of the read speed of the migration source storage in which the migration source volume is created, and calculates the read speed-time curve Rt of the migration source storage.

The storage operation support apparatus 1 calculates the current read speed Rtn of the migration source storage on the read speed-time curve Rt of the migration source storage.

Then, it is assumed that the sufficient read speed Rs=the current read speed Rtn of the migration source storage+the insufficient read speed dr. The storage operation support apparatus 1 calculates the sufficient read speed Rs.

In a time interval in which a state in which the read speed Rv of the migration source storage on the read speed-time curve Rt of the migration source storage is larger than the sufficient read speed Rs (sufficient read speed Rs<read speed Rv of migration source storage) continues, a time interval whose length is longer than the predetermined time interval Ts is defined as a stable read time zone Tpr. The storage operation support apparatus 1, with reference to the migration source storage read speed table 243, calculates a time interval in which a state in which the read speed Rv of the migration source storage is larger than the sufficient read speed Rs (sufficient read speed Rs<read speed Rv of migration source storage) continues longer than the predetermined time interval Ts as the stable read time zone Tpr. The predetermined time interval Ts can be appropriately set, for example, one hour.

Next, at the current time, a calculation method in a case where "minimum speed Vmin≤read speed Rn of the migration source volume at the current time" (case: minimum speed Vmin≤read speed Rn) will be described. In this case, the insufficient read speed dr≤0 (insufficient read speed dr=minimum speed Vmin−read speed Rn of migration source volume at current time point≤0). Therefore, the read speed of the migration source volume at the current time is sufficiently large.

The storage operation support apparatus 1, with reference to the migration source storage read speed table 243, calculates a time interval in which a state in which the read speed Rv of the migration source storage is larger than the minimum speed Vmin (minimum speed Vmin<read speed Rv of the migration source storage) continues longer than the predetermined time interval Ts as the stable read time zone Tpr.

Next, the storage operation support apparatus 1 calculates a stable write time zone of the migration destination volume, and stores information on the calculated stable write time zone in the main memory device 22 (Step S307). Here, the storage operation support apparatus 1 calculates the stable write time zone of the migration destination volume as follows.

The stable write time zone Tpw is a time zone in which it can be estimated that data can be stably written from the migration destination volume. As described below, the stable write time zone Tpw is calculated similarly to the stable read time zone Tpr described above.

First, at the current time, a calculation method in a case where "the minimum speed Vmin>the write speed Wn of the migration destination volume at the current time" (case: the minimum speed Vmin>the write speed Wn) will be described.

Assume that the insufficient write speed dw=the minimum speed Vmin−the write speed Wn of the migration destination volume at the current time. The storage operation support apparatus 1 calculates the insufficient write speed dw.

A write speed-time curve Wt of the migration destination storage is calculated by complementing the data of the migration destination storage write speed table 244 storing the information of the temporal change of the write speed Wv.

The storage operation support apparatus 1 calculates the current write speed Wtn of the migration destination storage on the calculated write speed-time curve Wt of the migration destination storage.

Then, the sufficient write speed Ws=the current write speed Wtn of the migration destination storage+the insufficient write speed dw. The storage operation support apparatus 1 calculates the sufficient write speed Ws.

A time interval whose length is longer than the predetermined time interval Ts in a time interval in which a state in which the write speed Wv of the migration destination storage is larger than the sufficient write speed Ws (the sufficient write speed Ws<the write speed Wv of the migration destination storage) continues is defined as a stable write time zone Tpw. The storage operation support apparatus 1, with reference to the migration destination storage write speed table 244, calculates a time interval in which a state in which the write speed Wv of the migration destination storage is larger than the sufficient write speed Ws (the sufficient write speed Ws<the write speed Wv of the migration destination storage) continues longer than the predetermined time interval Ts as the stable write time zone Tpw.

Next, at the current time, a calculation method in a case where "the minimum speed Vmin≤ the write speed Wn of the migration destination volume at the current time" (case: the minimum speed Vmin≤ the write speed Wn) will be described. In this case, the insufficient write speed dw≤0 (the insufficient write speed dw=the minimum speed Vmin−the write speed Wn of the migration destination volume at the current time point≤0). Therefore, the data writing speed of the migration destination volume at the current time is sufficiently large.

The storage operation support apparatus 1, with reference to the migration destination storage write speed table 244, calculates a time interval in which a state in which the write speed Wv of the migration destination storage is larger than the minimum speed Vmin (minimum speed Vmin<the write speed Wv of the migration destination storage) continues longer than the predetermined time interval Ts as the stable read time zone Tpr.

Next, the storage operation support apparatus 1 calculates a stable migration time zone Tpt based on the stable read time zone Tpr and the stable write time zone Tpw, calculates a migration possible time at which it can be estimated that migration of the migration data from the migration source volume to the migration destination volume becomes possible, and stores information regarding the migration such as the migration possible time in the migration hold table 242 (Step S308).

The stable migration time zone Tpt is a time zone in which it can be estimated that data can be stably copied from the migration source volume to the migration destination volume. The storage operation support apparatus 1 calculates an overlapping time zone between the stable read time zone Tpr and the stable write time zone Tpw as the stable migration time zone Tpt. In the stable migration time zone Tpt, it can be estimated that data can be stably copied from the migration source volume to the migration destination volume.

The storage operation support apparatus 1 calculates the start time (earliest time) of the stable migration time zone Tpt as the migration possible time.

The storage operation support apparatus 1 stores the calculated value of the migration possible time in the migration record. The migration record in which the calculated value of the migration possible time is stored is hereinafter referred to as a "second migration record". Then, when the migration record is stored in the migration hold table 242, the storage operation support apparatus 1 replaces the migration record stored in the migration hold table 242 with the second migration record. In addition, when the migration record is stored in the migration possible table 241, the storage operation support apparatus 1 deletes the migration possible record from the migration possible table 241 and stores the second migration record in the migration hold table 242. As a result, the storage operation support apparatus 1 updates the information included in the record of the migration possible table 241 or the record of the migration possible table 241 corresponding to the migration record.

Next, the storage operation support apparatus 1 determines whether or not the processing has been completed for the migration IDs of all the records stored in the migration possible table 241 and the migration hold table 242 (Step S309). When the storage operation support apparatus 1 determines that the processing has not been completed for the migration IDs of all the records stored in the migration possible table 241 and the migration hold table 242, the storage operation support apparatus 1 returns to Step S202 and continues the processing. Meanwhile, when the storage operation support apparatus 1 determines that the processing has been completed for the migration IDs of all the records stored in the migration possible table 241 and the migration hold table 242, the storage operation support apparatus 1 executes the process of Step S310.

Next, the storage operation support apparatus 1 reads and outputs the migration possible table 241 and the migration hold table 242 to the main memory device 22, and ends the processing (Step S310). Here, the output destination is the user terminal 500 or the output device 25 of the storage operation support apparatus 1. When the migration possible table 241 and the migration hold table 242 are output, the migration possible table 2711 and the migration hold table 2712 displayed on the evaluation screen displayed on the user terminal 500 or the output device 25 of the storage operation support apparatus 1 are replaced with the output migration possible table 241 and the migration hold table 242 and displayed.

Advantageous Effects of Invention

As described above, in the embodiment, the storage operation support apparatus 1 calculates the total score for the evaluation target storage device based on the load ($CO_2$ emission amount) to the environment, the cost, and the performance. The total score is the value including the load on the environment ($CO_2$ emission amount). Therefore, it is easy for the user to comprehensively evaluate the storage device including the load on the environment with reference to the total score. As a result, the storage operation support apparatus 1 facilitates the operation of the storage device by the user. Then, the storage operation support apparatus 1 can more accurately calculate the $CO_2$ emission amount and the power consumption of the storage system apparatus required for fulfilling social responsibility of a company, and makes it easier for the company to manage and reduce the $CO_2$ emission amount and the power consumption. Further, the storage operation support apparatus 1 actually reduces the $CO_2$ emission amount to facilitate construction of a sustainable environment.

In addition, the storage operation support apparatus 1 acquires the carbon dioxide emission coefficient ($CO_2$ emission coefficient) from the power supply source, and calculates the environment score based on the acquired carbon dioxide emission coefficient ($CO_2$ emission coefficient). As a result, the storage operation support apparatus 1 can calculate a more appropriate environment score, and the user can operate the storage device more appropriately.

In addition, the storage operation support apparatus 1 calculates a sum of a product of the environment score weight and the environment score, a product of the cost score weight and the cost score weight, and a product of the performance score weight and the performance score as the total score. As a result, the storage operation support apparatus 1 can calculate a more appropriate total score, and the user can operate the storage device more appropriately.

In addition, the storage operation support apparatus 1 executes evaluation processing (see FIG. 21) on the evaluation unit 11 at predetermined time intervals. As a result, the state of the storage device can be evaluated over time, and the state of the storage device can be appropriately examined. As a result, the user can operate the storage device more appropriately.

In addition, the storage operation support apparatus 1 generates information of a storage device time-series evaluation graph (see the storage device time-series evaluation graph 1915 in FIG. 19) indicating a time-series change of at least one score (environment score, cost score, performance score, total score) for each storage device in use. As a result, the user can easily evaluate the storage device in use in time series with reference to the storage device time-series evaluation graph.

In addition, the storage operation support apparatus 1 calculates the environment score, the cost score, the performance score, and the total score for both the storage device in the on-premises environment and the storage device in the cloud environment. As a result, the user can easily evaluate not one of the storage device in the on-premises environment and the storage device in the cloud environment but both of them. Therefore, the user can easily operate an appropriate storage device.

In addition, the storage operation support apparatus 1 can perform evaluation (calculate environment score, cost score, performance score, and total score) on the candidate storage device (unused storage device) in the storage candidate evaluation processing (see FIG. 24, storage candidate evaluation unit 32). As a result, the storage operation support apparatus 1 facilitates selection of a new storage device when a new storage device is introduced. As a result, the storage operation support apparatus 1 facilitates selection of an appropriate storage device in which the load on the environment, the cost, and the performance are balanced.

In Step S207 of the flowchart of the storage candidate evaluation processing in FIG. 24, the storage operation support apparatus 1 generates the "information of a score comparison graph indicating the magnitude of at least one score of the environment score, the cost score, the performance score, and the total score for each candidate storage device", so that the bar graph (score comparison graph) 2612 and the chart (score comparison graph) 2613 can be easily presented to the user. Then, the user can easily compare the environment score, the cost score, and the performance score among the candidate storage devices of the storage device to be newly used by referring to the bar graph 2612 and the chart 2613. As a result, it is easy to select an appropriate storage device in which the load on the environment, the cost, and the performance are balanced. Therefore, the storage operation support apparatus 1 facilitates selection of an appropriate storage device in which the load on the environment, the cost, and the performance are balanced.

In addition, the storage operation support apparatus 1 determines whether the candidate storage device (unused storage device) satisfies the requirement related to the capacity of the storage device based on the storage device conversion capacity (converted storage capacity) in the storage candidate evaluation processing (see FIG. 24, storage candidate evaluation unit 32). As a result, the storage operation support apparatus 1 can more appropriately determine whether the requirement related to the capacity of the storage device is satisfied in the storage candidate evaluation processing (see FIG. 24, storage candidate evaluation unit 32). As a result, the user can easily operate an appropriate storage device.

In addition, when it is determined that the immediate migration is possible from the migration source volume to the migration destination volume in the migration support processing (the migration support unit 33) (Step S304 of the flowchart of the migration support processing of FIG. 28: Yes), the storage operation support apparatus 1 generates the migration possible table 241 (migration possible volume information) in which the migration time required for reading the migration data from the migration source volume and storing the migration data in the migration destination volume, the migration destination volume ID (migration source volume specific information), and the migration source volume ID (migration destination volume specific information) are associated with each other in Step S305. As a result, with reference to the migration possible table 241 (migration possible volume information), the user can migrate the volume that can be stably migrated, so that the user can easily appropriately migrate the volume.

In addition, in the migration support processing (the migration support unit 33), when the information on the presence or absence of the apparent migration time reduction function from the migration source volume to the migration destination volume, which is the value of the migration time reduction function 1303 of the migration information record of the migration possible table 241 or the migration time reduction function 1403 of the migration information record of the migration hold table 242, indicates that the apparent migration time reduction function is "present", the storage operation support apparatus 1 sets the data migration time as the predetermined migration reduction time. As a result, the storage operation support apparatus 1 can calculate the migration time more suitably, and the user can easily appropriately migrate the volume.

In addition, the storage operation support apparatus 1 calculates the migration possible time at which migration of migration data from the migration source volume to the migration destination volume can be estimated to be possible, and generates the migration hold table 242 (migration hold information) in which the migration volume ID (migration source volume specific information), the migration destination volume ID (migration destination volume specific information), and the calculated migration possible time are associated with each other. As a result, the user can easily formulate an appropriate migration schedule.

Note that the present invention is not limited to the above-described embodiments, and includes various modifications. In addition, for example, the above-described embodiments have been described in detail in order to describe the present invention in an easy-to-understand manner, and are not necessarily limited to those having all the described configurations. Further, it is possible to perform addition/deletion/replacement on other configurations with respect to a portion of the configurations of the embodiment.

Note that the present invention is not limited to the above-described embodiments, and includes various modifications. For example, the above-described embodiments have been described in detail for easy understanding of the present invention, and are not necessarily limited to those having all the described configurations. In addition, it is possible to add, delete, and replace other configurations for a part of the configuration of the embodiment.

What is claimed is:

1. A storage operation support apparatus that evaluates a storage device, the storage operation support apparatus comprising:
a storage unit that stores storage device information that stores information on a state of a storage device;
an evaluation unit that evaluates an evaluation target storage device to be evaluated; and
a storage candidate evaluation unit,
wherein, with reference to the storage device information, the evaluation unit:
calculates an environment score indicating a magnitude of a load on an environment of the evaluation target storage device,
calculates a cost score indicating a magnitude of a cost of the evaluation target storage device,
calculates a performance score indicating a slow speed of reading and writing data of the evaluation target storage device, and
calculates a total score using the environment score, the cost score, and the performance score;
the storage unit stores unused storage device usage information in which unused storage device specific information for specifying an unused storage device and unused storage device specification information stored in association with a specification of the unused storage device are associated with each other;
the storage candidate evaluation unit, when requirement information for a new storage device to be newly used is input, acquires candidate storage device specific information capable of specifying a candidate storage device that satisfies a requirement included in the requirement information among the unused storage devices with reference to the unused storage device usage information; and
the evaluation unit:
sets the candidate storage device associated with the candidate storage device specific information as the evaluation target storage device,
calculates the environment score, the cost score, the performance score, and the total score of the evaluation target storage device, and
generates candidate storage device evaluation information in which the calculated environment score, cost score, performance score, total score, and candidate storage device specific information are associated with one another.

2. The storage operation support apparatus according to claim 1,
wherein the storage device information includes information of power consumption per unit time of the storage device, and
the evaluation unit:
acquires a carbon dioxide emission coefficient from a power supply source that supplies power to the evaluation target storage device,
acquires power consumption per unit time of the evaluation target storage device with reference to the storage device information, and calculates the environment score based on the acquired carbon dioxide emission coefficient and the acquired power consumption per unit time of the evaluation target storage device.

3. The storage operation support apparatus according to claim 1,
wherein the evaluation unit calculates, as the total score, a sum of a product of an environment score weight and the environment score, a product of a cost score weight and the cost score, and a product of a performance score weight and the performance score.

4. The storage operation support apparatus according to claim 1,
wherein every predetermined time, the evaluation unit:
sets each storage device in use as the evaluation target storage device,
calculates the environment score, the cost score, the performance score, and the total score of each storage device in use, and
generates storage device evaluation information in which the calculated environment score, cost score, performance score, and total score of each storage device in use, in-use storage device specific information capable of specifying each storage device in use, and a date and time when the total score is calculated are associated with each other, and stores the storage device evaluation information in the storage unit.

5. The storage operation support apparatus according to claim 4,
wherein the evaluation unit generates data of a storage device time-series evaluation graph indicating a time-series change in at least one score of the environment score, the cost score, the performance score, and the total score for each storage device in use.

6. The storage operation support apparatus according to claim 1,
wherein the evaluation target storage device is at least one storage device in an on-premises environment and at least one storage device in a cloud environment.

7. The storage operation support apparatus according to claim 1,
wherein the evaluation unit generates and outputs data of a score comparison graph indicating a magnitude of at least one score of the environment score, the cost score, the performance score, and the total score for each candidate storage device.

8. The storage operation support apparatus according to claim 1,
wherein the unused storage device usage information includes information in which the unused storage device specific information, a storage capacity of the unused storage device, and a compression rate in a case where the unused storage device can compress and store data are associated with each other, and
the storage candidate evaluation unit, when the requirement information includes a storage capacity lower limit value of the new storage device to be newly used, calculates a value obtained by dividing the storage capacity of the unused storage device by the compression rate as a converted storage capacity with reference to the unused storage device specification information, determines whether the calculated converted storage capacity is larger than the storage capacity lower limit value, and, when it is determined that the converted storage capacity is not larger than the storage capacity lower limit value, determines that the unused storage device does not satisfy the requirement included in the requirement information.

9. The storage operation support apparatus according to claim 1, further comprising a migration support unit,
wherein the migration support unit:
acquires migration source volume specific information capable of specifying a migration source volume and migration destination volume specific information capable of specifying a migration destination volume to which migration data stored in the migration source volume is to be saved,
acquires a data reading speed of the migration source volume, a data writing speed of the migration destination volume, and a migration data amount of the migration data,
determines whether immediate migration from the migration source volume to the migration destination volume is possible based on the acquired data reading speed of the migration source volume and the acquired data writing speed of the migration destination volume, and
when it is determined that the immediate migration from the migration source volume to the migration destination volume is possible,
generates migration possible volume information in which a migration time required to read migration data from the migration source volume and store the migration data in the migration destination volume, the migration source volume specific information, and the migration destination volume specific information are associated with each other, the migration time being calculated based on the acquired data reading speed of the migration source volume and the acquired data writing speed of the migration destination volume.

10. The storage operation support apparatus according to claim 9,
wherein in a case where the migration source volume specific information, the migration destination volume specific information, information on presence or absence of an apparent migration time reduction function from the migration source volume to the migration destination volume are acquired, and
the migration support unit, when the acquired information on the presence or absence of the apparent migration time reduction function from the migration source volume to the migration destination volume indicates the presence of the apparent migration time reduction function, sets the migration time as a predetermined migration reduction time.

11. The storage operation support apparatus according to claim 10, wherein the storage unit stores:
migration source storage read speed information that stores information on a temporal change of a read speed of the migration source storage in which the migration source volume is created, and
migration destination storage write speed information that stores information on a temporal change of a write speed of the migration destination storage in which the migration destination volume is created, and
the migration support unit:
calculates when it is determined that immediate migration from the migration source volume to the migration destination volume is not possible, a migration possible time at which migration of migration data from the migration source volume to the migration destination volume can be assumed to be possible with reference to the migration source storage read speed information and the migration destination storage write speed information, and generates migration hold information in which the migration source volume specific information, the migration destination volume specific information, and the calculated migration possible time are associated with each other.

12. A storage operation support method in a storage operation support apparatus including:

a memory device that stores storage device information for storing information on a state of a storage device and unused storage device usage information in which unused storage device specific information for specifying an unused storage device and unused storage device specification information stored in association with a specification of the unused storage device are associated with each other; and a processor, in which the processor evaluates the storage device, the storage operation support method comprising causing the processor to execute evaluation processing of evaluating an evaluation target storage device to be evaluated and storage candidate evaluation processing, wherein the evaluation processing includes, with reference to the storage device information stored in the memory device:

calculating an environment score indicating a magnitude of a load on an environment of the evaluation target storage device, calculating a cost score indicating a magnitude of a cost of the evaluation target storage device, calculating a performance score indicating a slow speed of reading and writing data of the evaluation target storage device, and calculating a total score using the environment score, the cost score, and the performance score; and the storage candidate evaluation processing includes, when requirement information for a new storage device to be newly used is input, acquiring candidate storage device specific information capable of specifying a candidate storage device that satisfies a requirement included in the requirement information among the unused storage devices with reference to the unused storage device usage information, setting the candidate storage device associated with the candidate storage device specific information as the evaluation target storage device, calculating the environment score, the cost score, the performance score, and the total score of the evaluation target storage device, and generating candidate storage device evaluation information in which the calculated environment score, cost score, performance score, total score, and candidate storage device specific information are associated with one another.

* * * * *